(12) United States Patent
Murata et al.

(10) Patent No.: US 10,557,004 B2
(45) Date of Patent: Feb. 11, 2020

(54) LONG FILM

(71) Applicant: ZEON CORPORATION, Chiyoda-ku, Tokyo (JP)

(72) Inventors: Naoki Murata, Tokyo (JP); Masaya Hirano, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 34 days.

(21) Appl. No.: 16/075,270

(22) PCT Filed: Feb. 3, 2017

(86) PCT No.: PCT/JP2017/004129
§ 371 (c)(1),
(2) Date: Aug. 3, 2018

(87) PCT Pub. No.: WO2017/145718
PCT Pub. Date: Aug. 31, 2017

(65) Prior Publication Data
US 2019/0040215 A1    Feb. 7, 2019

(30) Foreign Application Priority Data
Feb. 26, 2016    (JP) ................... 2016-035980

(51) Int. Cl.
*C08J 5/18*    (2006.01)
*G02B 1/14*    (2015.01)
(Continued)

(52) U.S. Cl.
CPC ............. *C08J 5/18* (2013.01); *B29C 59/16* (2013.01); *B29C 2791/003* (2013.01);
(Continued)

(58) Field of Classification Search
CPC ...... C08J 5/18; C08J 2345/00; C08J 2333/10; G02B 1/14; B29C 59/16; B29C 2791/003;
(Continued)

(56) References Cited

U.S. PATENT DOCUMENTS 4,942,000 A * 7/1990 Penoyer .................. B29C 53/32
101/17
5,393,589 A * 2/1995 Zeller ..................... B29C 59/04
264/167
(Continued)

FOREIGN PATENT DOCUMENTS

JP    2009040964 A    2/2009
JP    2011143710 A    7/2011

OTHER PUBLICATIONS

Aug. 28, 2018, International Preliminary Report on Patentability issued in the International Patent Application No. PCT/JP2017/004129.

*Primary Examiner* — Donald J Loney
(74) *Attorney, Agent, or Firm* — Kenja IP Law PC

(57) ABSTRACT

A long-length film including a plurality of knurl portions shaped by continuous linear concavo-convex portions on at least one surface thereof, wherein the plurality of knurl portions are aligned in a lengthwise direction of the long-length film, a planar shape of the knurl portion seen from a thickness direction of the long-length film includes: 10 or more corners having a curvature radius of 0.3 mm or less and an angle of 100° or less or a curvature radius of 0.2 mm or less and an angle of 120° or less, per one planar shape of the knurl portion; and 18 or more straight portions having a straight shape, per one planar shape of the knurl portion.

6 Claims, 5 Drawing Sheets

(51) Int. Cl.
*B29C 59/16* (2006.01)
*G02B 5/30* (2006.01)
*B32B 3/30* (2006.01)
*B32B 3/28* (2006.01)

(52) U.S. Cl.
CPC .......... *B29C 2791/009* (2013.01); *B32B 3/28* (2013.01); *B32B 3/30* (2013.01); *C08J 2333/06* (2013.01); *C08J 2333/10* (2013.01); *C08J 2345/00* (2013.01); *C08J 2365/00* (2013.01); *C08J 2475/04* (2013.01); *G02B 1/14* (2015.01); *G02B 5/30* (2013.01); *Y10T 428/24479* (2015.01); *Y10T 428/24612* (2015.01)

(58) Field of Classification Search
CPC ....... B29C 2791/009; B32B 3/28; B32B 3/30; Y10T 420/24479; Y10T 428/24612
See application file for complete search history.

(56) References Cited

U.S. PATENT DOCUMENTS

| | | | |
|---|---|---|---|
| 5,491,014 A * | 2/1996 | Ranoia | B29C 59/02 428/120 |
| 2010/0055402 A1 | 3/2010 | Yamashita et al. | |

\* cited by examiner

LONG FILM

FIELD

The present invention relates to a long-length film including knurl portions formed thereon.

BACKGROUND

A film such as an optical film has been produced in prior art as an elongated long-length film from the viewpoint of achieving high productivity. However, since a film is thin in general, handleability is sometimes poor. Therefore, it has been proposed to form concavo-convex portions at an end section in the widthwise direction of a film for improving handleability of the film (Patent Literatures 1 and 2).

CITATION LIST

Patent Literature

Patent Literature 1: Japanese Patent Application Laid-Open No. 2011-143710 A
Patent Literature 2: Japanese Patent Application Laid-Open No. 2009-040964 A

SUMMARY

Technical Problem

During ordinary production, a long-length film is subjected to various treatments while being continuously conveyed in the lengthwise direction, and thereafter wound in a form of a roll and collected. However, in prior art technologies such as those disclosed in Patent Literatures 1 and 2, the effect of improving handleability of a film is not satisfactory. Specifically, improvement in the conveyance properties and winding properties of a long-length film has been insufficient. As described herein, the "conveyance properties" refers to the properties of suppressing meanders of a long-length film during conveyance, and the smaller the amount of meanders is, the more preferable. The amount of meanders refers to the amount of displacement in the widthwise direction of a conveyed long-length film. The "winding properties" refers to the properties of being capable of suppressing the winding displacement in the widthwise direction of a long-length film when the long-length film is wound into a roll shape. The smaller the winding displacement is, the more preferable.

The present invention has been devised in view of the aforementioned problem. An object of the present invention is to provide a long-length film being excellent in conveyance properties and winding properties.

Solution to Problem

The present inventor intensively conducted research for solving the aforementioned problem. As a result, the present inventor has found that meanders and winding displacement of a long-length film can be suppressed by increasing the number of specific corner portions and the number of specific straight portions in the planar shape of the knurl portion seen from the thickness direction. The present invention has thus been completed.

That is, the present invention is as follows.

(1) A long-length film comprising a plurality of knurl portions shaped by continuous linear concavo-convex portions on at least one surface thereof, wherein
the plurality of knurl portions are aligned in a lengthwise direction of the long-length film,
a planar shape of the knurl portion seen from a thickness direction of the long-length film includes:
10 or more corners having a curvature radius of 0.3 mm or less and an angle of 100° or less or a curvature radius of 0.2 mm or less and an angle of 120° or less, per one planar shape of the knurl portion; and
18 or more straight portions having a straight shape, per one planar shape of the knurl portion.
(2) The long-length film according to (1), wherein a ratio $L_{TD}/L_{MD}$ between a length $L_{TD}$ of one knurl portion in a widthwise direction of the long-length film and a length $L_{MD}$ of one knurl portion in a lengthwise direction of the long-length film satisfies $L_{TD}/L_{MD} \geq 2$.
(3) The long-length film according to (1) or (2), comprising a substrate layer formed of any of a cyclic olefin resin and a (meth)acrylic resin.
(4) The long-length film according to (3), comprising the substrate layer and a functional layer disposed on a side of the knurl portions of the substrate layer, wherein
the functional layer has a thickness which is 10% or less of a thickness of the substrate layer.

Advantageous Effects of Invention

According to the present invention, a long-length film being excellent in conveyance properties and winding properties can be provided.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the long-length film may be, but not particularly limited to, for example 100,000 times or less the width.

In the following description, the planar shape of a knurl portion formed on a film means the shape of a knurl portion seen from the thickness direction of the film, unless otherwise specified.

In the following description, the term "(meth)acrylic" encompasses "acrylic", "methacrylic", and a combination of these, and the term "(meth)acrylate" encompasses "acrylate", "methacrylate", and a combination of these.

[1. Embodiment of Long-Length Film]

Figure 1:
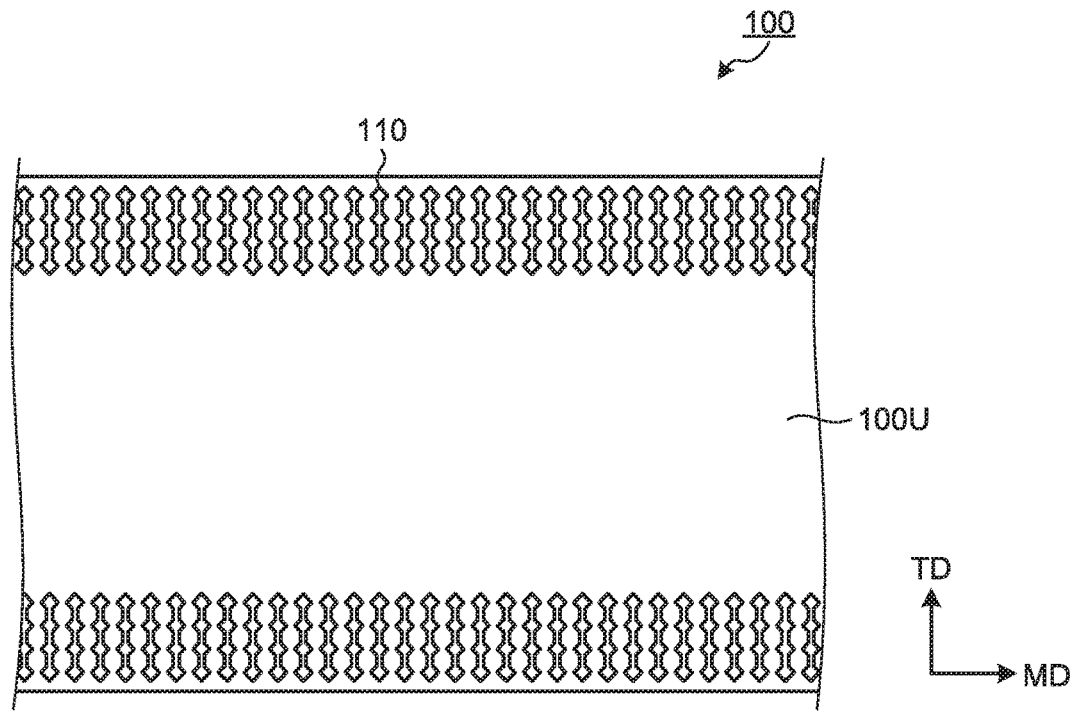
FIG. 1 is a plan view schematically illustrating a long-length film according to an embodiment of the present invention, seen from the thickness direction of the long-length film.

FIG. 1 is a plan view schematically illustrating a long-length film 100 according to an embodiment of the present invention, seen from the thickness direction of the long-length film 100.

As illustrated in FIG. 1, the long-length film 100 is a long-length film, and includes a plurality of knurl portions 110 on at least one surface 100U. The plurality of knurl portions 110 are aligned in a lengthwise direction MD of the long-length film 100. The knurl portions 110 are usually disposed on at least one end section in a widthwise direction TD of the long-length film 100, preferably at both end sections. Although the planar shapes of the knurl portions 110 seen from the thickness direction may be different from each other, an example in which all the knurl portions 110 have identical planar shapes is shown in the present embodiment.

Figure 2:
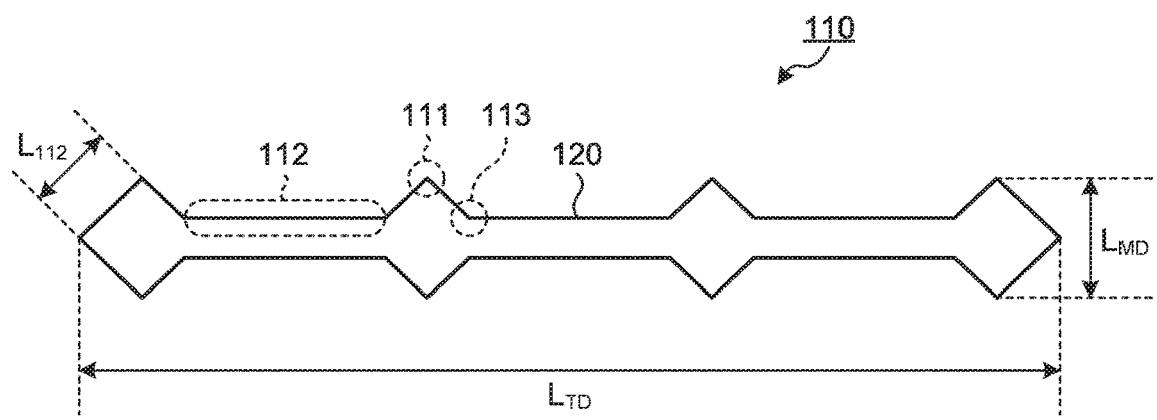
FIG. 2 is a plan view schematically illustrating a planar shape of one of knurl portions provided to a long-length film according to an embodiment of the present invention, seen from the thickness direction of the long-length film.

FIG. 2 is a plan view schematically illustrating a planar shape of one of the knurl portions 110 provided to the long-length film 100 according to an embodiment of the present invention, seen from the thickness direction of the long-length film 100.

As illustrated in FIG. 2, the knurl portion 110 is shaped by continuous linear concavo-convex portions 120. These concavo-convex portions 120 are formed by irradiation with laser light. Therefore, the concavo-convex portion 120 is a trace of the movement of an irradiation point of laser light, and usually formed as a continuous line drawn with one stroke. Accordingly, the knurl portion 110 has a specific planar shape drawn by such linear concavo-convex portions 120.

In the present embodiment, the planar shape of the knurl portion 110 seen from the thickness direction of the long-length film 100 satisfies the following requirements (A) and (B).

(A) The planar shape of the knurl portion 110 includes 10 or more corners 111 having (a) a curvature radius of 0.3 mm or less and an angle of 100° or less or (b) a curvature radius of 0.2 mm or less and an angle of 120° or less, per one planar shape of the knurl portion 110.

(B) The planar shape of the knurl portion 110 has 18 or more straight portions 112 having a straight shape, per one planar shape of the knurl portion 110.

When the knurl portion 110 satisfying these requirements (A) and (B) is provided, the long-length film 100 has favorable conveyance properties and winding properties.

Hereinafter, the aforementioned requirement (A) will be described.

The planar shape of the knurl portion 110 usually includes the straight portions 112 shaped by the concavo-convex portions 120 that extends in a straight manner and non-straight portions 113 shaped by the concavo-convex portions 120 that extends in a non-straight manner. Among the non-straight portions 113, a portion having (a) a curvature radius of 0.3 mm or less and an angle of 100° or less or (b) a curvature radius of 0.2 mm or less and an angle of 120° or less is referred to as the corner portion 111.

Figure 3:
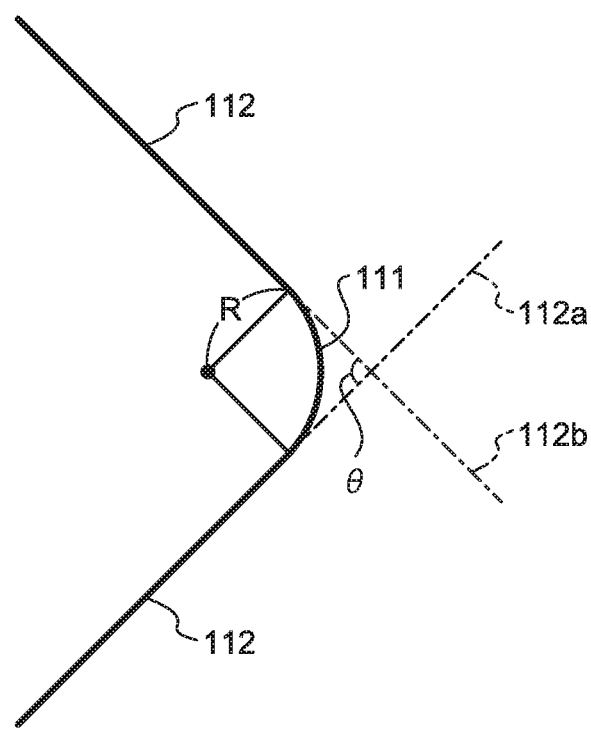
FIG. 3 is an enlarged plan view schematically illustrating one of corner portions of a knurl portion provided to a long-length film according to an embodiment of the present invention.

FIG. 3 is an enlarged plan view schematically illustrating one of the corner portions 111 of the knurl portion 110 provided to the long-length film 100 according to an embodiment of the present invention.

The corner portion 111 is macroscopically a sharp corner. However, when microscopically observed, the corner portion 111 is usually round as illustrated in FIG. 3. Herein, a curvature radius R of the round portion is the curvature radius of the corner portion 111. An angle θ between lines 112a and 112b which are extended lines of two straight portions 112 intersecting at the corner portion 111 when the corner portion 111 is macroscopically seen is the angle of the aforementioned corner portion 111.

As illustrated in FIG. 2, the number of corner portions 111 per one planar shape of the knurl portion 110 according to the present embodiment is usually 10 or more, more preferably 12 or more, and more preferably 15 or more. When the knurl portion 110 has a large number of corner portions 111 in this manner, the long-length film 100 can have improved conveyance properties and winding properties. The upper limit of the number of corner portions 111 per one planar shape of the knurl portion 110 is preferably 40 or less, more preferably 30 or less, and particularly preferably 25 or less, from the viewpoint of facilitating the formation of the knurl portion 110, although not particularly limited thereto.

A description will be given hereinbelow of the mechanism of improving conveyance properties and winding properties of the long-length film 10 by the knurl portion 110 having a large number of corner portions 111. However, the technical scope of the present invention is not limited by the following description of the mechanism.

Figure 4:
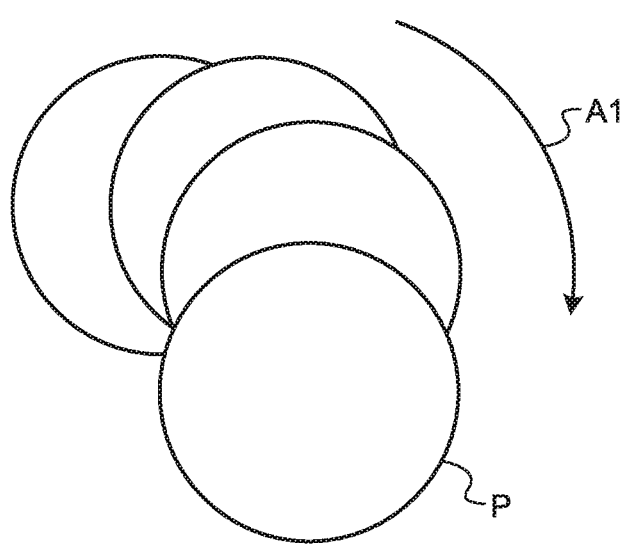
FIG. 4 is a plan view schematically illustrating movement of an irradiation point P of laser light with which irradiation is performed for forming a corner portion.
Figure 5:
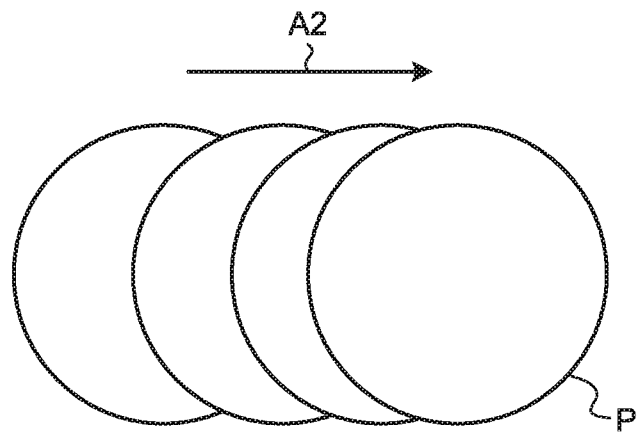
FIG. 5 is a plan view schematically illustrating movement of an irradiation point P of laser light with which irradiation is performed for forming a straight portion.

FIG. 4 is a plan view schematically illustrating movement of an irradiation point P of laser light with which irradiation is performed for forming the corner portion 111. FIG. 5 is a plan view schematically illustrating movement of an irradiation point P of laser light with which irradiation is performed for forming the straight portion 112. In FIG. 4 and FIG. 5, the irradiation point P shown therein moves in directions indicated by arrows A1 and A2.

When the linearly continuous concavo-convex portions 120 is formed, a film is irradiated with laser light while the irradiation point P of laser light is moved, as illustrated in FIG. 4 and FIG. 5. When the straight portion 112 is formed, the irradiation point P moves in a straight manner, as illustrated in FIG. 5. On the other hand, when the corner portion 111 is formed, the irradiation point P moves in such a manner as to turn with a steep angle, as illustrated in FIG. 4. When the irradiation point P is moved in a manner to make a steep turn, the irradiation time of laser light at an inner portion of the movement direction becomes longer, thereby increasing the energy density of the laser light with which irradiation is performed. Therefore, a height H (see FIG. 6) of the concavo-convex portion 120 increases at the corner portion 111. When the height H of the concavo-convex portion 120 is high, the contact pressure at the corner portion 111 can be increased when the long-length film 100 is brought into contact with another member.

Accordingly, when the long-length film 100 is conveyed, the contact pressure between a conveyance roll and the long-length film 100 can be increased at the corner portion 111. Thus, when the knurl portion 110 has a large number of corner portions 111, the gripping force (frictional force) of the long-length film 100 to a conveyance roll can be increased. Consequently, meanders can be suppressed, so that conveyance properties can be improved.

Also, when the long-length film 100 is wound on a roll, the contact pressure between stacked portions of the wound long-length film 100 can be increased at the corner portion 111. Therefore, when the knurl portion 110 has a large number of corner portions 111, the gripping force between stacked portions of the wound long-length film 100 can be increased. Consequently, winding displacement can be suppressed, so that conveyance properties can be improved.

Subsequently, the aforementioned requirement (B) will be described.

As illustrated in FIG. 2, the number of straight portions 112 having a straight shape per one planar shape of the knurl portion 110 in the planar shape of the knurl portion 110 is usually 18 or more, more preferably 25 or more, and more preferably 30 or more. When the knurl portion 110 has a large number of straight portions 112 in this manner, the long-length film 100 can have improved conveyance properties and winding properties. The upper limit of the number of straight portions 112 per one planar shape of the knurl portion 110 is preferably 45 or less, more preferably 40 or less, and particularly preferably 35 or less, from the viewpoint of facilitating the formation of the knurl portion 110, although not particularly limited thereto.

A description will be given hereinbelow of the mechanism of improving conveyance properties and winding properties of the long-length film 10 by the knurl portion 110 having a large number of straight portions 112. However, the technical scope of the present invention is not limited by the following description of the mechanism.

The straight portion 112 is shaped by the concavo-convex portions 120. Therefore, the contact pressure of the straight portion 112 when the long-length film 100 is brought into contact with another member can be increased, although it is not larger than that at the corner portion 111. Therefore, with the knurl portion 110 having a large number of straight portions 112 in addition to the corner portions 111, the contact pressure between a conveyance roll and the long-length film as well as the contact pressure between stacked portions of the wound long-length film 100 can also be increased by the action of the straight portion 112 in the long-length film 100. Since the contact pressure can be increased in this manner, the gripping force of the long-length film 100 to a conveyance roll as well as the gripping force between stacked portions of the wound long-length film 100 can be further increased. Therefore, the conveyance properties and winding properties can be effectively improved.

As illustrated in FIG. 2, a length $L_{112}$ of one straight portion 112 is preferably 0.1 mm or more, more preferably 0.2 mm or more, and particularly preferably 0.3 mm or more, and is preferably 5 mm or less, more preferably 4 mm or less, and particularly preferably 3 mm or less.

It is preferable that a ratio $L_{TD}/L_{MD}$ between a length $L_{TD}$ of one knurl portion 110 in the widthwise direction TD of the long-length film 100 and a length $L_{MD}$ of one knurl portion 110 in the lengthwise direction of the long-length film 100 falls within a specific range. Specifically, the aforementioned ratio $L_{TD}/L_{MD}$ is preferably 2 or more, more preferably 2.5 or more, and particularly preferably 3 or more. When the ratio $L_{TD}/L_{MD}$ falls within the aforementioned range, the knurl portion 110 can be formed without deformation of the shape. The upper limit of the ratio $L_{TD}/L_{MD}$ is preferably 15 or less, more preferably 13 or less, and particularly preferably 10 or less, although not particularly limited thereto.

It is preferable that the lengths $L_{TD}$ and $L_{MD}$ of the knurl portion 110 are appropriately set such that the ratio $L_{TD}/L_M$ falls within the aforementioned range. Specifically, the length $L_{TD}$ of one knurl portion 110 in the widthwise direction TD of the long-length film 100 is preferably 3 mm or more, more preferably 5 mm or more, and particularly preferably 7 mm or more, and is preferably 20 mm or less, more preferably 17 mm or less, and particularly preferably 15 mm or less. The length $L_{MD}$ of one knurl portion 110 in the lengthwise direction of the long-length film 100 is preferably 0.1 mm or more, more preferably 0.5 mm or more, and particularly preferably 1 mm or more, and is preferably 20 mm or less, more preferably 15 mm or less, and particularly preferably 10 mm or less.

As illustrated in FIG. 1, the knurl portions 110 are usually aligned in the lengthwise direction MD of the long-length film 100 at a specific pitch. The pitch for the knurl portions 110 is preferably 0.5 mm or more, more preferably 1 mm or more, and particularly preferably 1.5 mm or more, and is preferably 10 mm or less, more preferably 7 mm or less, and particularly preferably 5 mm or less. The pitch for the knurl portions 110 may be constant or varied.

Figure 6:
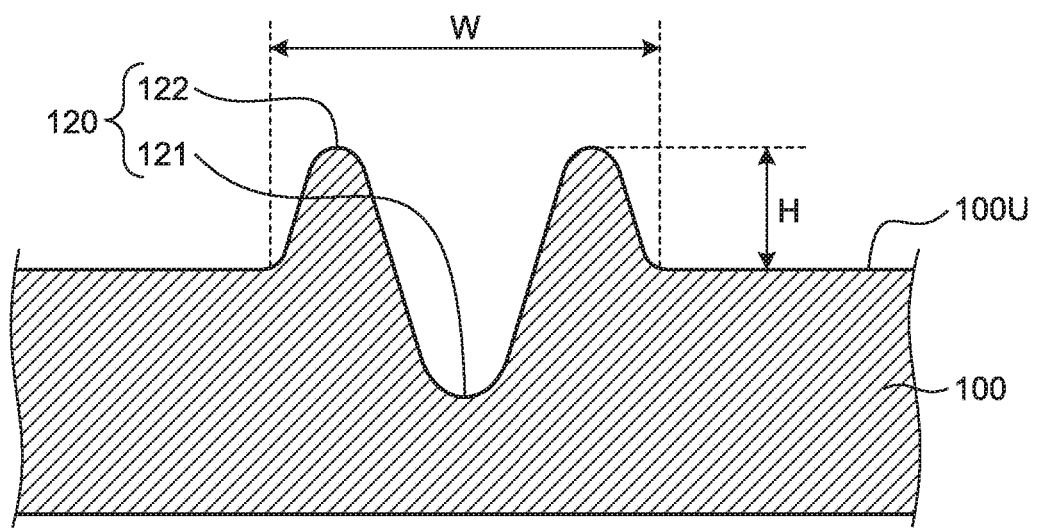
FIG. 6 is a cross-sectional view schematically illustrating a cross section cut along a plane perpendicular to an extending direction of a linear concavo-convex portion contained in a knurl portion provided to a long-length film according to an embodiment of the present invention.

FIG. 6 is a cross-sectional view schematically illustrating a cross section cut along a plane perpendicular to an extending direction of a linear concavo-convex portion 120 contained in the knurl portion 110 provided to the long-length film 100 according to an embodiment of the present invention.

As illustrated in FIG. 6, the concavo-convex portion 120 shaping the aforementioned knurl portion 110 includes a concave portion 121 and a convex portion 122 disposed on both sides of the concave portion 121. Usually, the concave portion 121 corresponds to a portion where a resin has been removed by heat melting or ablation due to irradiation with laser light, and the convex portion 122 corresponds to a portion where the resin heated and fluidized due to the irradiation with laser light has been raised. Since the convex portion 122 projects from the surface 100U of the surrounding long-length film 100, the long-length film 100 substantially becomes thick in this concavo-convex portion 120. Therefore, as previously described, the long-length film 100 has favorable handleability such as conveyance properties and winding properties.

The height H of the concavo-convex portion 120 may be uniform or non-uniform. Usually, the height H of the concavo-convex portion 120 at the corner portion 111 of the knurl portion 110 is different from that at the straight portion 112. The height H at the corner portion 111 can vary between the inside convex portion 122 and the outside convex portion 122.

The average height of the concavo-convex portion 120 at the corner portion 111 of the knurl portion 110 is preferably 1 μm or more, more preferably 2 μm or more, and particularly preferably 3 μm or more, and is preferably 25 μm or less, more preferably 20 µm or less, and particularly preferably 15 µm or less. When the average height of the concavo-convex portion 120 at the corner portion 111 is equal to or more than the lower limit value of the aforementioned range, winding displacement during the winding of the long-length film 100 can be suppressed. When the average height of the concavo-convex portion 120 at the corner portion 111 is equal to or less than the upper limit value of the aforementioned range, the long-length film 100 can be prevented from deforming due to generation of a difference in diameter of a roll on which the film has been wound, between a portion containing the knurl portion 110 (for example, the axial end section of a roll) and another portion (for example, the axial center section of a roll).

The average height of the concavo-convex portion 120 at the straight portion 112 of the knurl portion 110 is preferably 0.5 µm or more, more preferably 1 µm or more, and particularly preferably 1.5 µm or more, and is preferably 25 µm or less, more preferably 20 µm or less, and particularly preferably 15 µm or less. When the average height of the concavo-convex portion 120 at the straight portion 112 is equal to or more than the lower limit value of the aforementioned range, winding displacement during the winding of the long-length film 100 can be suppressed. When the average height of the concavo-convex portion 120 at the straight portion 112 is equal to or less than the upper limit value of the aforementioned range, the knurl portion 110 can be formed without deformation of the shape.

The width W of the concavo-convex portion 120 is preferably 0.1 µm or more, more preferably 0.15 µm or more, and particularly preferably 0.2 µm or more, and is preferably 1 µm or less, more preferably 0.75 µm or less, and particularly preferably 0.5 µm or less. When the width W of the concavo-convex portion 120 is equal to or more than the lower limit value of the aforementioned range, winding displacement during the winding of the long-length film 100 can be suppressed. When the width W of the concavo-convex portion 120 is equal to or less than the upper limit value of the aforementioned range, the knurl portion 110 can be formed without deformation of the shape.

The width and thickness of the long-length film 100 are not particularly limited, and any width and thickness suitable for an intended use may be adopted. The width of the long-length film 100 is preferably 700 mm or more, more preferably 1000 mm or more, and further more preferably 1200 mm or more, and is preferably 2500 mm or less, more preferably 2200 mm or less, and further more preferably 2000 mm or less. The thickness of the long-length film 100 is preferably 1 µm or more, more preferably 5 µm or more, and further more preferably 20 µm or more, and is preferably 1000 µm or less, more preferably 300 or less, and further more preferably 150 µm or less.

When the long-length film 100 is used as an optical film, the long-length film 100 preferably has high transparency in a region not having the knurl portion 110. Specifically, the total light transmittance of the long-length film 100 in the aforementioned region is preferably 85% to 100%, and more preferably 92% to 100%. The haze of the long-length film 100 in the aforementioned region is preferably 0% to 5%, more preferably 0% to 3%, and particularly preferably 0% to 2%. Herein, the total light transmittance may be measured using "turbidimeter NDH-2000" manufactured by Nippon Denshoku Industries Co., Ltd. in accordance with JIS K7105. The haze may be measured using an "NDH2000" turbidimeter manufactured by Nippon Denshoku Industries Co., Ltd.

The aforementioned long-length film 100 may be produced by a production method including a step of irradiating with laser light a film before the knurl portions 110 are formed. Hereinafter, the film before the knurl portions 110 are formed is sometimes appropriately referred to as a "pretreatment film".

Irradiation with laser light is usually performed while a pretreatment film is continuously conveyed in the lengthwise direction of the pretreatment film. Irradiation with laser light onto at least one surface of a pretreatment film causes heat melting or ablation to locally occur at a location irradiated with laser light. Accordingly, at the location irradiated with laser light, convex deformation and concavo deformation as the concavo-convex portion 120 can be caused on a pretreatment film.

Since such formation of the knurl portions 110 with laser light eliminates the need for mechanical force, residual stress in the knurl portions 110 is unlikely to remain. Therefore, occurrence of breakage starting from the knurl portions 110 in the long-length film 100 can be easily suppressed. Further, even when a thin pretreatment film is used, breakage of the film during the formation of the knurl portions 110 can be easily suppressed. Furthermore, occurrence of foreign substances due to the formation of the knurl portions 110 can be easily suppressed.

Upon the aforementioned irradiation with the laser light, the irradiation point P exposed to laser light on a pretreatment film is moved such that a desired planar shape of the knurl portion 110 is drawn. Accordingly, the concavo-convex portions 120 are formed on a trace of the movement of the irradiation point P of laser light. Therefore, the knurl portion 110 having a desired planar shape can be formed.

When the irradiation point P of laser light is moved, it is desirable that the irradiation point P continuously draws the planar shape of the knurl portion 110 without interruption of the line (drawn with one stroke). This allows irradiation with laser light to be continuously performed during the formation of one knurl portion 110. Therefore, unevenness in shape of the knurl portion 110 can be suppressed. Thus, the knurl portion 110 can be stably formed.

The moving speed of the irradiation point P of laser light can be optionally set within the range that enables the formation of a desired knurl portion 110. The specific moving speed is preferably 500 mm/s or more, more preferably 1000 mm/s or more, and particularly preferably 1500 mm/s or more, and is preferably 10000 mm/s or less, more preferably 8000 mm/s or less, and particularly preferably 6000 mm/s or less.

Examples of a laser device as the laser light irradiation device may include an ArF excimer laser device, a KrF excimer laser device, a XeCl excimer laser device, a YAG laser device (in particular, third harmonic generation or fourth harmonic generation), a YLF or YVO4 solid-state laser device (in particular, third harmonic generation or fourth harmonic generation), a Ti:S laser device, a semiconductor laser device, a fiber laser device, and a carbon dioxide laser device. Among these laser devices, a carbon dioxide laser device is preferable, from the viewpoint of being relatively inexpensive and being capable of efficiently obtaining output suitable for the processing of a film.

The output of laser light is preferably 1 W or more, more preferably 5 W or more, and further preferably 15 W or more, and is preferably 120 W or less, more preferably 100 W or less, further preferably 80 W or less, and further more preferably 70 W or less. When the output of laser light is equal to or more than the lower limit value of the aforementioned range, insufficiency in irradiation amount of laser light can be suppressed, so that the knurl portion 110 can be stably formed. When the output of laser light is equal to or less than the upper limit value of the aforementioned range, generation of through holes in the film can be suppressed.

[2. Composition of Long-Length Film]

As the aforementioned long-length film, a resin film is usually used. This resin film may be a stretched film, or may be an unstretched film. The resin film may be a single-layer film including only a substrate layer, or may be a multilayer film further including an optional layer in combination with the substrate layer.

As the substrate layer, a layer formed of a resin is usually used. As such a resin, various resins may be used according to the use of the long-length film. In particular, a cyclic olefin resin or (meth)acrylic resin is preferable. A film including a substrate layer formed of a cyclic olefin resin or (meth)acrylic resin is generally likely to pull in air during the winding, causing winding displacement. In contrast to this, when the aforementioned knurl portions are formed, winding displacement can be effectively suppressed in such a film that is likely to cause winding displacement.

The cyclic olefin resin is a resin containing a cyclic olefin polymer. The cyclic olefin polymer has excellent mechanical properties, heat resistance, transparency, low hygroscopicity, size stability and light-weight property.

The cyclic olefin polymer is a polymer having an alicyclic structure as the structural unit of the polymer. The cyclic olefin polymer may be a polymer having an alicyclic structure in its main chain, a polymer having an alicyclic structure in its side chain, a polymer having an alicyclic structure in its main and side chains, and a mixture of two or more of these polymers at any ratio. Among these, from the viewpoint of mechanical strength and heat resistance, a polymer having an alicyclic structure in its main chain is preferable.

Examples of the alicyclic structure may include a saturated alicyclic hydrocarbon (cycloalkane) structure, and an unsaturated alicyclic hydrocarbon (cycloalkene, cycloalkyn) structure. Among these, from the viewpoint of mechanical strength and heat resistance, a cycloalkane structure and a cycloalkene structure are preferable, and a cycloalkane structure is particularly preferable.

The number of carbon atoms constituting the alicyclic structure is preferably 4 or more, and more preferably 5 or more, and is preferably 30 or less, more preferably 20 or less, and particularly preferably 15 or less, per one alicyclic structure. When the number of carbon atoms constituting the alicyclic structure falls within this range, mechanical strength, heat resistance, and moldability of the resin are highly balanced.

The ratio of the structural unit having the alicyclic structure in the cyclic olefin polymer is preferably 55% by weight or more, further preferably 70% by weight or more, and particularly preferably 90% by weight or more. When the ratio of the structural unit having the alicyclic structure in the cyclic olefin polymer falls within this range, transparency and heat resistance are improved.

Examples of the cyclic olefin polymer may include a norbornene-based polymer, a monocyclic olefin-based polymer, a cyclic conjugated diene-based polymer, a vinyl alicyclic hydrocarbon-based polymer, and hydrogenated products thereof. Among these, a norbornene-based polymer is particularly suitable because of its excellent moldability.

Examples of the norbornene-based polymer may include a ring-opening polymer of a monomer having a norbornene structure and a hydrogenated product thereof; and an addition polymer of a monomer having a norbornene structure and a hydrogenated product thereof. Examples of the ring-opening polymer of the monomer having a norbornene structure may include a ring-opening homopolymer of one type of monomer having a norbornene structure, a ring-opening copolymer of two or more types of monomers having a norbornene structure, and a ring-opening copolymer of a monomer having a norbornene structure with another monomer copolymerizable therewith. Examples of the addition polymer of the monomer having a norbornene structure may include an addition homopolymer of one type of monomer having a norbornene structure, an addition copolymer of two or more types of monomers having a norbornene structure, and an addition copolymer of a monomer having a norbornene structure with another monomer copolymerizable therewith. Among these, a hydrogenated product of a ring-opening polymer of a monomer having a norbornene structure is particularly suitable from the viewpoint of moldability, heat resistance, low hygroscopicity, size stability, light-weight property, and the like.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodeca-3-ene (common name: tetracyclododecene), and derivatives of these compounds (for example, those with a substituent on the ring). Examples of the substituent may include an alkyl group, an alkylene group, and a polar group. A plurality of these substituents, which may be the same as or different from each other, may be bonded to the ring. As the monomer having a norbornene structure, one type thereof may be solely used, and two or more types thereof may also be used in combination at any ratio.

Examples of the polar group may include a heteroatom, and an atomic group having a heteroatom. Examples of the heteroatom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, an amido group, an imido group, a nitrile group, and a sulfonic acid group.

Examples of a monomer that is ring-opening copolymerizable with the monomer having a norbornene structure may include monocyclic olefins such as cyclohexene, cycloheptene, and cyclooctene, and derivatives thereof; and cyclic conjugated dienes such as cyclohexadiene and cycloheptadiene, and derivatives thereof. As the monomer that is ring-opening copolymerizable with the monomer having a norbornene structure, one type thereof may be solely used, and two or more types thereof may also be used in combination at any ratio.

The ring-opening polymer of the monomer having a norbornene structure may be produced, for example, by polymerizing or copolymerizing the monomer in the presence of a ring-opening polymerization catalyst.

Examples of a monomer that is addition copolymerizable with the monomer having a norbornene structure may include α-olefins of 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Among these, α-olefin is preferable, and ethylene is more preferable. As the monomer that is addition copolymerizable with the monomer having a norbornene structure, one type thereof may be solely used, and two or more types thereof may also be used in combination at any ratio.

The addition polymer of the monomer having a norbornene structure may be produced, for example, by polymerizing or copolymerizing the monomer in the presence of an addition polymerization catalyst.

The above-mentioned hydrogenated products of the ring-opening polymer and the addition polymer may be produced, for example, by hydrogenating an unsaturated carbon-carbon bond, preferably 90% or more thereof, in a solution of the ring-opening polymer and the addition polymer in the presence of a hydrogenation catalyst containing a transition metal such as nickel, palladium, or the like.

Among the norbornene-based polymers, it is preferable that the polymer has an X: bicyclo[3.3.0]octane-2,4-diyl-ethylene structure and a Y: tricyclo[4.3.0.1$^{2,5}$]decane-7,9-diyl-ethylene structure as structural units, wherein the amount of these structural units is 90% by weight or more relative to the entire structural unit of the norbornene-based polymer, and the content ratio of X and Y is 100:0 to 40:60 by weight ratio of X:Y. By using such a polymer, the film containing the norbornene-based polymer can be made to have excellent stability of optical properties without size change over a long period of time.

Examples of the monocyclic olefin-based polymer may include addition polymers of cyclic olefin-based monomers having a monocycle such as cyclohexene, cycloheptene, cyclooctene, and the like.

Examples of the cyclic conjugated diene polymer may include polymers obtained by cyclizing an addition polymer of a conjugated diene monomer such as 1,3-butadiene, isoprene, chloroprene, and the like; 1,2- or 1,4-addition polymers of a cyclic conjugated diene monomer such as cyclopentadiene, cyclohexadiene, and the like; and hydrogenated products thereof.

Examples of the vinyl alicyclic hydrocarbon polymer may include a polymer of a vinyl alicyclic hydrocarbon-based monomer such as vinyl cyclohexene and vinyl cyclohexane and a hydrogenated product thereof; a hydrogenated product obtained by polymerizing a vinyl aromatic hydrocarbon-based monomer such as styrene and α-methylstyrene to obtain a polymer and hydrogenating an aromatic ring portion contained in the polymer; and a hydrogenated product of an aromatic ring of a copolymer such as a random copolymer or a block copolymer of a vinyl alicyclic hydrocarbon-based monomer or a vinyl aromatic hydrocarbon-based monomer and another monomer copolymerizable with these vinyl aromatic hydrocarbon-based monomer. Examples of the block copolymer may include a diblock copolymer, a triblock copolymer or a multiblock copolymer having blocks more than the triblock copolymer, and an inclined block copolymer.

The weight-average molecular weight (Mw) of the cyclic olefin polymer is preferably 10,000 or more, more preferably 15,000 or more, and particularly preferably 20,000 or more, and is preferably 100,000 or less, more preferably 80,000 or less, and particularly preferably 50,000 or less. When the weight-average molecular weight falls within this range, mechanical strength and moldability of the resin are highly balanced, and it is thus preferable. Herein, the weight-average molecular weight is a polyisoprene- or polystyrene-equivalent weight-average molecular weight measured by gel permeation chromatography using cyclohexane as a solvent. When the sample is not dissolved in cyclohexane, toluene may be used as the solvent in the gel permeation chromatography.

The molecular weight distribution (weight-average molecular weight (Mw)/number-average molecular weight (Mn)) of the cyclic olefin polymer is preferably 1.2 or more, more preferably 1.5 or more, and particularly preferably 1.8 or more, and is preferably 3.5 or less, more preferably 3.0 or less, and particularly preferably 2.7 or less. When the molecular weight distribution is equal to or more than the lower limit value of the aforementioned range, the productivity of the polymer can be improved and the production cost can be suppressed. When the molecular weight distribution is equal to or less than the upper limit value, the amount of the low molecular component is reduced, whereby the relaxation at the time of high temperature exposure can be suppressed, and the stability of the film can be enhanced.

The glass transition temperature of the cyclic olefin polymer is preferably 130° C. or higher, and more preferably 135° C. or higher, and is preferably 150° C. or lower, and more preferably 145° C. or lower. When the glass transition temperature thereof is equal to or higher than the lower limit value of the aforementioned range, durability of the film under high temperature environment can be improved. When the glass transition temperature thereof is equal to or lower than the upper limit value, stretching treatment can be facilitated.

The absolute value of the photoelastic coefficient of the cyclic olefin polymer is $10 \times 10^{-12}$ Pa$^{-1}$ or less, more preferably $7 \times 10^{-12}$ Pa$^{-1}$ or less, and particularly preferably $4 \times 10^{-12}$ Pa$^{-1}$ or less. The photoelastic coefficient C is a value represented by "$C = \Delta n / \sigma$" where $\Delta n$ represents a birefringence and $\sigma$ represents a stress. When the photoelastic coefficient of the cyclic olefin polymer falls within the aforementioned range, it is possible to suppress the fluctuation in in-plane retardation Re of the film.

The saturated water absorption ratio of the cyclic olefin polymer is preferably 0.03% by weight or less, more preferably 0.02% by weight or less, and particularly preferably 0.01% by weight or less. When the saturated water absorption ratio falls within the aforementioned range, a change of an in-plane retardation Re and a thickness-direction retardation Rth of the film with the lapse of time can be reduced. Furthermore, when the long-length film is used as a polarizing plate protective film to produce a polarizing plate and a liquid crystal display device, the polarizing plate and liquid crystal display device can be prevented from deterioration, and thus display function of the liquid crystal display device can be maintained in a favorable state stably over a long period of time.

A saturated water absorption ratio is a value expressed in percentage of an increased mass obtained by immersing a test piece in water at a predefined temperature for a predefined time period relative to the mass of the test piece before the immersion. The measurement is usually performed after immersion in water at 23° C. for 24 hours. The saturated water absorption ratio of the cyclic olefin polymer may be adjusted within the aforementioned range by, for example, reducing the amount of the polar group in the cyclic olefin polymer. From the viewpoint of lowering the saturated water absorption ratio, it is preferable that the cyclic olefin polymer has no polar group.

The ratio of the cyclic olefin polymer in the cyclic olefin resin is preferably 50% by weight to 100% by weight, more preferably 70% by weight to 100% by weight, and particularly preferably 90% by weight to 100% by weight. When the ratio of the polymer falls within the aforementioned range, the film can have sufficient heat resistance and transparency.

The cyclic olefin resin may contain an optional component other than the cyclic olefin polymer as long as the component does not significantly impair the advantageous effects of the present invention. Examples of the optional components may include a colorant such as a dye and a pigment; a fluorescent brightener; a dispersant; a heat stabilizer; a light stabilizer; an ultraviolet absorber; an antistatic agent; an antioxidant; and a lubricant. As these components, one type thereof may be solely used, and two or more types thereof may also be used in combination at any ratio.

(Meth)acrylic resins are resins containing a (meth)acrylic polymer. A (meth)acrylic polymer means a polymer of acrylic acid or an acrylic acid derivative. Examples thereof may include polymers and copolymers of acrylic acid, an acrylic acid ester, acrylamide, acrylonitrile, methacrylic acid, and a methacrylic acid ester. Since the (meth)acrylic polymer has high strength and is hard, a film having high mechanical strength can be achieved.

As the (meth)acrylic polymer, a polymer containing a structural unit having a structure obtained by polymerizing a (meth)acrylic acid ester is preferable. Examples of the (meth)acrylic acid ester may include alkyl esters of (meth) acrylic acid. Among these, a compound having a structure derived from (meth)acrylic acid and a cycloalkanol or an alkanol of 1 to 15 carbon atoms is preferable. A compound having a structure derived from (meth)acrylic acid and an alkanol of 1 to 8 carbon atoms is more preferable. When the number of carbon atoms is small, elongation at the time of film breakage can be made small.

Examples of the acrylic acid ester may include methyl acrylate, ethyl acrylate, n-propyl acrylate, i-propyl acrylate, n-butyl acrylate, i-butyl acrylate, sec-butyl acrylate, t-butyl acrylate, n-hexyl acrylate, cyclohexyl acrylate, n-octyl acrylate, 2-ethylhexyl acrylate, n-decyl acrylate, and n-dodecyl acrylate.

Examples of the methacrylic acid ester may include methyl methacrylate, ethyl methacrylate, n-propyl methacrylate, i-propyl methacrylate, n-butyl methacrylate, i-butyl methacrylate, sec-butyl methacrylate, t-butyl methacrylate, n-hexyl methacrylate, n-octyl methacrylate, 2-ethylhexyl methacrylate, n-decyl methacrylate, and n-dodecyl methacrylate.

The aforementioned (meth)acrylic acid ester may have a substituent, for example, a hydroxyl group and a halogen atom within the range of not significantly impairing the advantageous effects of the present invention. Examples of the (meth)acrylic acid ester having such a substituent may include 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, 3-chloro-2-hydroxypropyl methacrylate, and glycidyl methacrylate. One type thereof may be solely used, and two or more types thereof may also be used in combination at any ratio.

The (meth)acrylic polymer may be a polymer of only an acrylic acid or acrylic acid derivative, but may be a copolymer of an acrylic acid or acrylic acid derivative and an optional monomer copolymerizable therewith. Examples of the optional monomer may include an α,β-ethylenically unsaturated carboxylic acid ester monomer other than the (meth)acrylic acid ester described above, and an α,β-ethylenically unsaturated carboxylic acid monomer, an alkenyl aromatic monomer, a conjugated diene monomer, a non-conjugated diene monomer, a carboxylic acid unsaturated alcohol ester, and an olefin monomer. One type thereof may be solely used, and two or more types thereof may also be used in combination at any ratio.

Specific examples of the α,β-ethylenically unsaturated carboxylic acid ester monomer other than the (meth)acrylic acid ester may include dimethyl fumarate, diethyl fumarate, dimethyl maleate, diethyl maleate, and dimethyl itaconate.

The α,β-ethylenically unsaturated carboxylic acid monomer may be any of a monocarboxylic acid, a polyvalent carboxylic acid, a partial ester of a polyvalent carboxylic acid, and a polyvalent carboxylic acid anhydride. Specific examples thereof may include crotonic acid, maleic acid, fumaric acid, itaconic acid, monoethyl maleate, mono n-butyl fumarate, maleic anhydride, and itaconic anhydride.

Specific examples of the alkenyl aromatic monomer may include styrene, α-methylstyrene, methyl α-methylstyrene, vinyltoluene, and divinylbenzene.

Specific examples of the conjugated diene monomer may include 1,3-butadiene, 2-methyl-1,3-butadiene, 1,3-pentadiene, 2,3-dimethyl-1,3-butadiene, 2-chloro-1,3-butadiene, and cyclopentadiene.

Specific examples of the non-conjugated diene monomer may include 1,4-hexadiene, dicyclopentadiene, and ethylidene norbornene.

Specific examples of the carboxylic acid unsaturated alcohol ester monomer may include vinyl acetate.

Specific examples of the olefin monomer may include ethylene, propylene, butene, and pentene.

When the (meth)acrylic polymer include an optional monomer, the amount of the structural unit having a structure obtained by polymerizing the optional monomer in the (meth)acrylic polymer is preferably 50% by weight or less, more preferably 15% by weight or less, and particularly preferably 10% by weight or less.

Among these (meth)acrylic polymers, a polymethacrylate is preferable, and in particular, a polymethylmethacrylate is more preferable.

The ratio of the (meth)acrylic polymer in the (meth) acrylic resin is preferably 50% by weight to 100% by weight, more preferably 70% by weight to 100% by weight, and particularly preferably 90% by weight to 100% by weight.

When the ratio of the polymer falls within the aforementioned range, sufficient mechanical strength can be imparted.

The (meth)acrylic resin may contain an optional component other than the (meth)acrylic polymer as long as the advantageous effects of the present invention are not significantly impaired. Examples of the optional component may include the same examples as the optional components the cyclic olefin resin may contain. As the optional component, one type thereof may be solely used, and two or more types thereof may also be used in combination at any ratio.

The aforementioned substrate layer may be produced by molding a resin by an appropriate film molding method. Examples of the film molding method may include a cast molding method, an extrusion molding method, and an inflation molding method. Among these, a melt extrusion method without the use of a solvent is preferable from the viewpoint of efficiently reducing the amount of remaining volatile component, earth environment and operation environment, and excellent production efficiency. As the melt molding method, although an inflation method using a die may be used, a T-die method is preferable from the viewpoint of excellent productivity and thickness accuracy.

When a multilayer film including two or more layers is used as the long-length film, the multilayer film preferably includes a substrate layer and a functional layer. The functional layer may be disposed on one side or both sides of the substrate layer. In particular, it is preferable that the functional layer is disposed on the side of the knurl portions of the substrate layer, and further preferable that the knurl portions are disposed on the surface of the functional layer.

Examples of such a functional layer may include an antistatic layer, a hardcoat layer, an adhesion prevention layer, and an adhesion facilitating layer.

The antistatic layer refers to a layer having a small surface resistance value. The specific surface resistance value of the antistatic layer is preferably $1.0 \times 10^6 \Omega/\square$ or more, more preferably $1.0 \times 10^7 \Omega/\square$ or more, and particularly preferably $1.0 \times 10^{10} \Omega/\square$ or more, and is preferably $1.0 \times 10^{10} \Omega/\square$ or less, more preferably $5.0 \times 10^9 \Omega/\square$ or less, and particularly preferably $1.0 \times 10^9 \Omega/\square$ or less. The surface resistance value may be measured using a digital ultra-insulation/microammeter ("DSM-8104" manufactured by Hioki E.E. Corporation) in accordance with JIS K6911. Such an antistatic layer may be formed with, for example, a resin containing conductive particles such as metal oxide particles and a polymer.

The hardcoat layer refers to a layer having high hardness. The specific hardness of the hardcoat layer in terms of the JIS pencil hardness is preferably B or higher, more preferably HB or higher, and particularly preferably H or higher. The JIS pencil hardness is determined by scratching the surface of the layer with pencils in accordance with JIS K5600-5-4. Scratching is performed with pencils with a variety of hardness which are inclined at the angle of 45° to which 500 gram force of downward load is applied. The hardness is determined as the hardness of the pencil that begins to create scratches. Such a hardcoat layer may be formed of, for example, a resin.

The adhesion prevention layer refers to a layer which has a coarse surface and can suppress intimate contact between the film and another film when the film is placed on the another film. Such an adhesion prevention layer may be formed of, for example, a resin containing a polymer and particles.

The adhesion facilitating layer refers to a layer which can exert high adhesiveness when the surface of the adhesion facilitating layer is bonded to another member. Such an adhesion facilitating layer may be formed of, for example, a resin containing a polymer.

Among the aforementioned functional layers, the adhesion facilitating layer is preferable. The adhesion facilitating layer is preferably a layer containing a water-based resin. The water-based resin is a resin which can be prepared as a solution or a dispersion with water as a medium.

A layer of the water-based resin may be formed on the surface of the substrate layer by applying the aqueous solution or dispersion containing a water-based resin onto the surface of the substrate layer, and then drying. Examples of the water-based resin may include a urethane resin, a polyester resin, and emulsions thereof, and preferably include a water-based urethane resin.

The water-based urethane resin contains polyurethane and, if necessary, an optional component.

Examples of the polyurethane contained in the water-based urethane resin may include polyurethane obtained by reacting (i) a component containing an average of two or more active hydrogens per one molecule and (ii) a polyvalent isocyanate component.

Examples of the polyurethane contained in the water-based urethane resin may include a polyurethane produced by neutralizing an isocyanate group-containing prepolymer obtained by urethanization reaction of the above-mentioned components (i) and (ii), performing chain extension using a chain extender, and then adding water to form a dispersion. Herein, the urethanization reaction of the components (i) and (ii) for obtaining the isocyanate group-containing prepolymer is carried out under the conditions of an excess of isocyanate groups in an organic solvent which is inert to the reaction and has a high affinity for water.

These polyurethanes may contain an acid structure (acid residue).

Any publicly known method may be used for the chain elongation method of the isocyanate group-containing prepolymer. For example, water, a water-soluble polyamine, a glycol or the like may be used as the chain extender, and the isocyanate group-containing prepolymer and the chain extender may be reacted in the presence of a catalyst, if necessary.

As the above-mentioned component (i) (i.e., a component containing an average of two or more active hydrogens per one molecule), those having an active hydrogen of a hydroxyl group are preferable. Specific examples of such compounds may include a polyol compound, a polyether polyol, a polyester polyol, a polyether ester polyol, and a polycarbonate polyol.

(1) Polyol Compound

Examples of the polyol compound may include ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, 2,2-dimethylpropanediol, and 1,4-butanediol.

(2) Polyether Polyol

Examples of the polyether polyol may include an alkylene oxide adduct of the polyol compound described above; a ring-opening (co)polymer of an alkylene oxide and a cyclic ether (such as tetrahydrofuran); polyethylene glycol, polypropylene glycol, a copolymer of ethylene glycol-propylene glycol; and glycols such as glycol, polytetramethylene glycol, polyhexamethylene glycol, and polyoctamethylene glycol.

(3) Polyester Polyol

Examples of the polyester polyol may include those obtained by polycondensation of a dicarboxylic acid or an anhydride thereof and a polyol compound under conditions of an excess of hydroxyl group. Examples of the dicarboxylic acid may include adipic acid, succinic acid, sebacic acid, glutaric acid, maleic acid, fumaric acid, and phthalic acid. Examples of the polyol compound may include ethylene glycol, propylene glycol, 1,4-butanediol, 1,6-hexanediol, 1,8-octamethylene diol, and neopentyl glycol, as mentioned in the above-described (1). More specific examples of the polyester polyol may include an ethylene glycol-adipic acid condensate, a butanediol-adipic condensate, a hexamethylene glycol-adipic acid condensate, an ethylene glycol-propylene glycol-adipic acid condensate, and a polylactone diol obtained by ring-opening polymerization of lactone with glycol as an initiator.

(4) Polyether Ester Polyol

Examples of the polyether ester polyol may include those obtained by adding an ether group-containing polyol (for example, the polyether polyol or diethylene glycol of the aforementioned (2)) to a dicarboxylic acid or an anhydride thereof as exemplified in the above (3), and reacting them with an alkylene oxide. Examples of the polyether ester polyol may include those obtained by adding a mixture of an ether group-containing polyol and another glycol to a dicarboxylic acid or an anhydride thereof as exemplified in the above (3), and reacting them with an alkylene oxide. More specifically, examples of the polyether ester polyol may include a polytetramethylene glycol-adipic acid condensate.

(5) Polycarbonate Polyol

Examples of the polycarbonate polyol may include compounds represented by the general formula HO—R—(O—C(O)—O—R)x-OH (wherein R represents a saturated fatty acid polyol residue of 1 to 12 carbon atoms, x represents the number of repeating units in the molecule, and is usually an integer of 5 to 50). These compounds may be obtained by an ester exchange method in which a saturated aliphatic polyol and a substituted carbonate (for example, diethyl carbonate, diphenyl carbonate, etc.) are reacted under conditions where the hydroxyl group is excessive; a method of reacting the saturated aliphatic polyol with phosgene; and a method of reacting the saturated aliphatic polyol with phosgene and, if necessary, further reacting a saturated aliphatic polyol thereafter.

As the compounds exemplified in (1) to (5) described above, one type thereof may be solely used, and two or more types thereof may also be used in combination at any ratio.

As the (ii) component (i.e., the polyvalent isocyanate component) to be reacted with the aforementioned (i) component, for example, aliphatic, alicyclic or aromatic compounds containing two or more isocyanate groups on average per one molecule may be used.

As the aliphatic diisocyanate compound, an aliphatic diisocyanate of 1 to 12 carbon atoms is preferable. Examples thereof may include hexamethylene diisocyanate, 2,2,4-trimethylhexane diisocyanate, and hexane diisocyanate (HDI). As the alicyclic diisocyanate compound, an alicyclic diisocyanate of 4 to 18 carbon atoms is preferable. Examples thereof may include 1,4-cyclohexane diisocyanate, methylcyclohexylene diisocyanate, isophorone diisocyanate (IPDI), and dicyclohexylmethane diisocyanate (HMDI). Examples of the aromatic diisocyanate may include tolylene diisocyanate, 4,4'-diphenylmethane diisocyanate, and xylylene diisocyanate.

Among water-based urethane resins, those in which polyurethane contains an acid structure (hereinafter, referred to as an "acid structure-containing water-based urethane resin" as appropriate) can be dispersed in water without a surfactant or with a less amount of surfactant. Therefore, it is expected to improve water resistance of the adhesion facilitating layer by the use of the acid structure-containing water-based urethane resin. This is called a self-emulsification type, meaning that the polyurethane resin can be dispersed and stabilized in water only with molecular ionicity without using a surfactant. Since the adhesion facilitating layer using such a water-based urethane resin does not need a surfactant, it is excellent in adhesiveness with the cyclic olefin resin and the (meth) acrylic resin and can maintain high transparency.

Examples of the acid structure may include acid groups such as a carboxyl group (—COOH) and a sulfonic acid group (—$SO_3H$). The acid structure may be present in the side chain of the polyurethane or its terminal. As the acid structure, one type thereof may be solely used, and two or more types thereof may also be used in combination at any ratio.

The containing amount of the acid structure as an acid value in the water-based urethane resin is preferably 20 mgKOH/g or more, and more preferably 25 mgKOH/g or more, and is preferably 250 mgKOH/g or less, and more preferably 150 mgKOH/g or less. When the acid value is equal to or more than the lower limit value of the aforementioned range, water dispersibility can be easily improved. When the acid value is equal to or less than the upper limit value of the aforementioned range, the water resistance of the adhesion facilitating layer can be improved.

Examples of the method for introducing an acid structure into polyurethane may include a method of preliminary introducing a carboxyl group into a polyether polyol, a polyester polyol, a polyether ester polyol or the like by substituting dimethylol alkanoic acid with a part or all of the glycol component described in the above (2) to (4). Examples of the dimethylol alkanoic acid used herein may include dimethylol acetic acid, dimethylol propionic acid, and dimethylol butyric acid. As the dimethylol alkanoic acid, one type thereof may be solely used, and two or more types thereof may also be used in combination at any ratio.

It is preferable that a part or all of the acid structure contained in the polyurethane is neutralized. By neutralizing the acid structure, water dispersibility of the water-based urethane resin can be improved. Examples of the neutralizing agent that neutralizes the acid component may include organic amines such as trimethylamine, triethylamine, tripropylamine, tributylamine, N-methyldiethanolamine and triethanolamine; and inorganic bases such as sodium hydroxide, potassium hydroxide, and ammonia. As the neutralizing agent, one type thereof may be solely used, and two or more types thereof may also be used in combination at any ratio.

The number-average molecular weight of the polyurethane is preferably 1,000 or more, and more preferably 20,000 or more, and is preferably 1,000,000 or less, and more preferably 200,000 or less.

As the water-based urethane resin, commercially available water-based urethane resins as they are may be used. Examples of the water-based urethane resin for use may include HYDRAN HW-301, HW-310, HW-311, HW-312B, HW-333, HW-340, HW-350, HW-375, HW-920, HW-930, HW-940, HW-950, HW-970, AP-10, AP-20, and ECOS 3000 manufactured by DIC Corporation; UPRENE UXA-3005 and CHEMITYLEN GA-500 manufactured by Sanyo Chemical Industries, Ltd.; SUPERFLEX 110, SUPERFLEX 150, SUPERFLEX 260S, SUPERFLEX 210, SUPERFLEX 410, SUPERFLEX 420, SUPERFLEX 500M, and SUPERFLEX 870 manufactured by DKS Co., Ltd.; ADEKA BONTIGHTER UHX-210 and ADEKA BONTIGHTER UHX-280 manufactured by Adeka Corporation; and DISPERCOLL U53, DISPERCOLL U54, DISPERCOLL U56, DISPERCOLL U42, IMPRANIL DLU, and IMPRANIL DLS manufactured by Sumika Bayer Urethane Co., Ltd. As the water-based urethane resin, one type thereof may be solely used, and two or more types thereof may also be used in combination at any ratio.

It is preferable that the adhesion facilitating layer includes a particle. Therefore, when the adhesion facilitating layer is formed of a water-based resin, the water-based resin preferably contains particles. With the particle, concavo-convex is formed on the surface of the adhesion facilitating layer. This can improve sliding properties of the surface of the adhesion facilitating layer to suppress occurrence of wrinkles during the winding of the long-length film.

The average particle diameter of the particles is preferably 1 nm or more, more preferably 5 nm or more, and particularly preferably 10 nm or more, and is preferably 500 nm or less, more preferably 300 nm or less, and particularly preferably 200 nm or less. When the average particle diameter is equal to or more than the lower limit value of the aforementioned range, sliding properties of the adhesion facilitating layer can be effectively enhanced. When the average particle diameter is equal to or less than the upper limit value of the aforementioned range, haze can be suppressed low. As the average particle diameter of the particles, there is adopted a particle diameter at which a cumulative volume calculated from the small diameter side in a particle diameter distribution measured by laser diffraction method becomes 50% (50% volume cumulative diameter D50).

As the particles, any of inorganic particles and organic particles may be used, and it is preferable to use water dispersible particles. Examples of the inorganic particle may include: inorganic oxides such as silica, titania, alumina, and zirconia; and calcium carbonate, talc, clay, calcined kaolin, calcined calcium silicate, hydrated calcium silicate, aluminum silicate, magnesium silicate, and calcium phosphate. Examples of the organic particle may include a silicone resin, a fluorine resin, and a (meth)acryl-based resin. Among these, silica is preferable. The particles of silica are excellent in the ability of suppressing occurrence of wrinkles and in transparency, unlikely to cause haze, and has no coloring. Therefore, an influence on the optical properties of the long-length film is smaller. Further, silica has favorable dispersibility and dispersion stability to the urethane resin. Among particles of silica, an amorphous colloidal silica particles are particularly preferable.

As the particle, one type thereof may be solely used, and two or more types thereof may be used in combination at any ratio.

The amount of the particles contained in the adhesion facilitating layer is preferably 0.5 part by weight or more, more preferably 5 parts by weight or more, and particularly preferably 8 parts by weight or more, and is preferably 20 parts by weight or less, more preferably 18 parts by weight or less, and particularly preferably 15 parts by weight or less, relative to 100 parts by weight of the polymer contained in the adhesion facilitating layer. When the amount of the particles is equal to or more than the lower limit value of the aforementioned range, handling properties of the film can be improved. Therefore, occurrence of wrinkles during the winding of the long-length film can be suppressed. When the amount of the particles is equal to or less than the upper limit value of the aforementioned range, the long-length film can maintain non-opaque appearance.

For the purpose of improving the mechanical strength of the adhesion facilitating layer, it is preferable that the water-based resin used for producing the adhesion facilitating layer further includes a crosslinking agent. As the crosslinking agent, a compound having a functional group capable of reacting with a reactive group possessed by a polymer contained in the water-based resin may be used. For example, when a water-based urethane resin is used as the water-based resin, it is preferable to use a water-based epoxy compound, a water-based amino compound, a water-based isocyanate compound, a water-based carbodiimide compound, a water-based oxazoline compound or the like as a crosslinking agent from the viewpoint of versatility of the material. Among these, from the viewpoint of adhesiveness, it is particularly preferable to use a water-based epoxy compound, a water-based amino compound, or a water-based oxazoline compound.

As the water-based epoxy compound, a water-soluble or emulsified compound having two or more epoxy groups is preferable. Examples of the water-based epoxy compounds may include ethylene glycol, diethylene glycol, triethylene glycol, polyethylene glycol, propylene glycol, and dipropylene glycol; diepoxy compounds obtained by etherification of 1 mol of glycols such as 1,4-butanediol, 1,6-hexane glycol, and neopentyl glycol with 2 moles of epichlorohydrin; polyepoxy compounds obtained by etherification of 1 mole of polyhydric alcohols such as glycerin, polyglycerin, trimethylolpropane, pentaerythritol, and sorbitol with 2 mols or more of epichlorohydrin; and epoxy compounds such as diepoxy compounds obtained by esterification of 1 mol of dicarboxylic acid such as phthalic acid, terephthalic acid, oxalic acid, and adipic acid with 2 mols of epichlorohydrin.

As the water-based amino compound, a water-soluble or emulsified compound having two or more amino groups is preferable. Examples of the water-based amino compound may include hydrazide compounds such as carbodihydrazide, oxalic acid dihydrazide, malonic acid dihydrazide, succinic acid dihydrazide, adipic acid dihydrazide, sebacic acid dihydrazide, dodecanedioic acid dihydrazide, isophthalic acid dihydrazide, terephthalic acid dihydrazide, glycolic acid dihydrazide, and polyacrylic acid dihydrazide, a melamine resin, a urea resin, and a guanamine resin.

As the water-based isocyanate compound, a water-soluble or emulsified compound having two or more non-blocked or blocked isocyanate groups may be used. Examples of the non-blocked isocyanate group may include compounds obtained by reacting a multi-functional isocyanate compound with a monovalent or polyvalent nonionic polyalkylene ether alcohol. Examples of the blocked isocyanate compound may include 2,4-tolylene diisocyanate (2,4-TDI), 2,6-tolylene diisocyanate (2,6-TDI), 4,4'-diphenylmethane diisocyanate (MDI), xylylene diisocyanate (XDI), isophorone diisocyanate (IPDI), methylcyclohexyl diisocyanate (H6TDI), 4,4'-dicyclohexylmethane diisocyanate (H12MDI), 1,3-bis(isocyanatomethyl)cyclohexane (H6XDI), tetramethylxylylene diisocyanate (TMXDI), 2,2,4-trimethylhexamethylene diisocyanate (TMHDI), hexamethylene diisocyanate (HDI), norbornene diisocyanate (NBDI), 2,4,6-triisopropylphenyl diisocyanate (TIDI), 1,12-diisocyanatododecane (DDI), 2,4-bis-(8-isocyanatoctyl)-1,3-dioctylcyclobutane (OCDI), and n-pentane-1,4-diisocyanate, and modified products thereof. Examples of the above-mentioned modified product may include an isocyanurate modified product, an adduct modified product, a biuret modified product, and an allophanate modified product. Furthermore, examples of the blocked isocyanate compound may include compounds obtained by modifying, with a polyoxyalkylene group, a carboxyl group or the like, a polymer of the blocked isocyanate compound exemplified above and having at least one isocyanate group, converting it to a water-soluble or water-dispersible product, and masking the isocyanate group thereof with a blocking agent (phenol, ε-caprolactam or the like).

As the water-based carbodiimide compound, a water-soluble or emulsified compound having two or more carbodiimide bonds (—N=C=N—) may be used. The compound having two or more carbodiimide bonds may be obtained, for example, by a method of forming a carbodiimide bond by performing decarboxylation reaction of two isocyanate groups using two or more molecules of a polyisocyanate and a carbodiimidization catalyst. There is no particular limitation on the polyisocyanate and the carbodiimidization catalyst used in producing the compound having two or more carbodiimide bonds and compounds that are publicly known in prior art may be used.

As the water-based oxazoline compound, a water-soluble or emulsified compound having two or more oxazoline groups may be used.

As the crosslinking agent, one type thereof may be solely used, and two or more types thereof may also be used in combination at any ratio.

The amount of the crosslinking agent in terms of an effective component is preferably 1 part by weight or more, and more preferably 3 parts by weight or more, and is preferably 70 parts by weight or less, and more preferably 65 parts by weight or less, relative to 100 parts by weight of the polymer contained in the water-based resin. When the composition is formulated in such a manner, both the strength of the adhesion facilitating layer and the stability of the aqueous dispersion of the water-based resin can be satisfied. Since the hydrazide compound and polyfunctional isocyanate compound having high reactivity among the crosslinking agents are likely to interact with the substrate layer and the adhesive, the amount thereof is preferably as small as possible. Specifically, the amount of the hydrazide compound and polyfunctional isocyanate compound in terms of an effective component is preferably 1 part by weight, more preferably 2 parts by weight or more, and further preferably 3 parts by weight or more, and is preferably 15 parts by weight or less, more preferably 10 parts by weight or less, and further preferably 8 parts by weight or less, relative to 100 parts by weight of the polymer contained in the water-based resin.

The adhesion facilitating layer may contain, if necessary, a component such as a heat stabilizer, a weathering stabilizer, a leveling agent, an antistatic agent, a slip agent, an anti-blocking agent, an anti-fogging agent, a lubricant, a dye, a pigment, a natural oil, a synthetic oil, and a wax. One type thereof may be solely used, and two or more types thereof may also be used in combination at any ratio.

The adhesion facilitating layer may be produced by preparing a resin composition containing a polymer and a solvent, and if necessary, an optional component such as particles, applying the resin composition onto the surface of the substrate layer to form a layer of the resin composition, and then curing the layer of the resin composition. The layer of the resin composition may be cured by irradiation with active energy rays such as ultraviolet rays, heating, or the like.

For example, when the adhesion facilitating layer is formed of a urethane resin, a urethane resin layer serving as the adhesion facilitating layer may be formed by directly applying an aqueous dispersion of a water-based urethane resin onto the surface of the substrate layer. The aqueous dispersion of the water-based urethane resin is a liquid composition in which the water-based urethane resin is dispersed in water, and may be in the form of, for example, an emulsion, a colloid dispersion system, an aqueous solution or the like.

The aqueous dispersion of the water-based urethane resin may contain a water-soluble solvent. Examples of the water-soluble solvent may include methanol, ethanol, isopropyl alcohol, acetone, tetrahydrofuran, N-methylpyrrolidone, dimethyl sulfoxide, ethylene glycol monomethyl ether, and ethylene glycol monobutyl ether. Among these, one type thereof may be solely used, and two or more types thereof may also be used in combination at any ratio.

The particle diameter of the water-based urethane resin particles dispersed in the aqueous dispersion of the water-based urethane resin is preferably 0.01 µm to 0.4 µm from the viewpoint of the optical properties of the long-length film. The particle diameter of the water-based urethane resin particles may be measured by a dynamic light scattering method. For example, the diameter may be measured by a light scattering spectrophotometer DLS-8000 series manufactured by Otsuka Electronics Co., Ltd.

The viscosity of the aqueous dispersion of the water-based urethane resin is preferably 15 mPa·s or less, and particularly preferably 10 mPa·s or less. When the viscosity of the dispersion of the water-based urethane resin falls within the aforementioned range, the aqueous dispersion of the water-based urethane resin can be uniformly applied onto the surface of the substrate layer. The viscosity of the aqueous dispersion of the water-based urethane resin is a value measured with a tuning fork vibration viscometer under the condition of 25° C. The viscosity of the aqueous dispersion of the water-based urethane resin may be adjusted by changing the proportion of the water-based urethane resin in the aqueous dispersion of the water-based urethane resin, the particle diameter of the water-based urethane resin, and the like.

The method for applying the coating liquid containing the water-based resin is not particularly limited, and a publicly known coating method may be adopted. Specific examples of the coating method may include a wire bar coating method, a dipping method, a spraying method, a spin coating method, a roll coating method, a gravure coating method, an air knife coating method, a curtain coating method, a slide coating method, and an extrusion coating method.

It is preferable to subject the surface of the substrate layer to a modification treatment before providing the adhesion facilitating layer to further improve the adhesion between the substrate layer and the adhesion facilitating layer. Examples of the surface modification treatment on the substrate layer may include an energy ray irradiation treatment and a chemical treatment. Examples of the energy ray irradiation treatment may include a corona discharge treatment, a plasma treatment, an electron beam irradiation treatment, and an ultraviolet irradiation treatment. From the viewpoint of treatment efficiency, a corona discharge treatment and a plasma treatment are preferable, and a corona discharge treatment is particularly preferable. Examples of the chemical treatment may include a saponification treatment, and a method of dipping in an oxidizing agent aqueous solution such as a potassium dichromate solution, concentrated sulfuric acid or the like, and then washing with water.

Furthermore, it is preferable to subject the surface of the adhesion facilitating layer to a hydrophilic surface treatment. The surface of the adhesion facilitating layer is usually a bonding surface when the long-length film is bonded to another optional member. Therefore, by further improving the hydrophilicity of this surface, it is possible to remarkably improve the adhesion between the long-length film and an optional member. Examples of the hydrophilic surface treatment may include a corona discharge treatment, a plasma treatment, a flame treatment, and an ultraviolet irradiation treatment. Among these, a corona discharge treatment and an atmospheric pressure plasma treatment are preferable from the viewpoint of treatment efficiency, and a corona discharge treatment is particularly preferable.

The thickness of the functional layer such as the adhesion facilitating layer described above is preferably 0.01% or more, more preferably 0.015% or more, and particularly preferably 0.02% or more, and is preferably 10% or less, more preferably 5% or less, and particularly preferably 2% or less, relative to the thickness of the substrate layer. When the thickness of the functional layer is equal to or more than the lower limit value of the aforementioned range, the function of the functional layer can be sufficiently exerted. When the thickness thereof is equal to or less than the upper limit value of the aforementioned range, coating of the resin composition uniformly within the surface of the film can be facilitated.

[Application of Long-Length Film]

The long-length film may be used in a wide variety of applications. In particular, the long-length film is preferably used as an optical film. Examples of the optical film may include a phase difference film, a polarizing plate protective film, and an optical compensation film. Among these, the above-described long-length film is preferably used as a polarizing plate protective film.

A polarizing plate usually includes a polarizer and a polarizing plate protective film. Therefore, when the long-length film described above is used as a polarizing plate protective film, the long-length film is usually bonded to a polarizer for use.

When the long-length film and the polarizer are bonded to each other, the long-length film and the polarizer may be directly bonded to each other without using an adhesive, or the long-length film and the polarizer may be bonded via an adhesive. The long-length film may be bonded to only one surface of the polarizer or both surfaces thereof. When the long-length film is bonded to only one surface of the polarizer, another film with high transparency may be bonded to the other surface of the polarizer.

As an example of the polarizer, a film produced by allowing a polyvinyl alcohol film to absorb iodine or a dichroic dye and thereafter uniaxially stretching the film in a boric acid bath may be used. As another example of the polarizer, a film produced by allowing a polyvinyl alcohol film to adsorb iodine or a dichroic dye, stretching the film, and further modifying a part of the polyvinyl alcohol unit in the molecular chain to be a polyvinylene unit may be used. Further, as the polarizer, for example, a polarizer having a function of separating polarized light into reflected light and transmitted light, such as a grid polarizer, a multilayer polarizer, a cholesteric liquid crystal polarizer, or the like may also be used. Among these, a polarizer containing polyvinyl alcohol is preferable. The degree of polarization of the polarizer is preferably 98% or more, and more preferably 99% or more. The average thickness of the polarizer is preferably 5 to 80 μm.

As an adhesive for bonding the long-length film and the polarizer, an optically transparent adhesive may be used. Examples of the adhesive may include an aqueous adhesive, a solvent type adhesive, a two-part curable type adhesive, a photo-curable type adhesive, and a pressure sensitive adhesive. Among these, an aqueous adhesive is preferable, and a polyvinyl alcohol-based aqueous adhesive is particularly preferable. As the adhesive, one type thereof may be solely used, and two or more types thereof may also be used in combination at any ratio.

Examples of the photo-curable type adhesive used may include acrylate adhesives including urethane (meth)acrylate, hydroxyalkyl (meth)acrylate, and acrylamide derivatives; and adhesives containing an epoxy compound (hereinafter, referred to as an "epoxy-based adhesive" as appropriate).

The urethane (meth)acrylate is not particularly limited. For example, a polyisocyanate is reacted with a polyhydric alcohol, and the resultant is further reacted with a hydroxyl group-containing (meth)acrylic compound and, if necessary, a hydroxyl group-containing allyl ether compound to obtain a radical-polymerizable unsaturated group-containing oligomer. Such an oligomer may be used as the urethane (meth)acrylate. As the urethane (meth) acrylate, a compound obtained by reacting a hydroxyl group-containing (meth) acrylic compound with a polyhydric alcohol and further reacting with a polyisocyanate may also be used. Among these, a urethane (meth)acrylate having 2 to 3 double bonds per molecule and having a number-average molecular weight of 500 to 3000 per double bond is preferable because adhesion strength, flexibility, photo-curability, and viscosity can be easily balanced. As the urethane (meth)acrylate, one type thereof may be solely used, and two or more types thereof may also be used in combination at any ratio.

The amount of the urethane (meth)acrylate in the adhesive is preferably 30% by weight to 50% by weight. When the amount of the urethane (meth)acrylate is 30% by weight or more, embrittlement of the adhesive can be suppressed. When the amount thereof is 50% by weight or less, excessive increase in viscosity can be suppressed, and adhesion strength can be enhanced.

Examples of the hydroxyalkyl (meth)acrylate may include hydroxyethyl (meth)acrylate, hydroxypropyl (meth)acrylate, and hydroxybutyl (meth)acrylate. Among these, hydroxyethyl methacrylate is particularly preferable. As the hydroxyalkyl (meth)acrylate, one type thereof may be solely used, and two or more types thereof may also be used in combination at any ratio.

The amount of the hydroxyalkyl (meth)acrylate in the adhesive is preferably 13% by weight to 40% by weight. When the amount of the hydroxyalkyl (meth)acrylate is 13% by weight or more, hydrophilicity of the entire adhesive can be increased, so that it is possible to increase the adhesion strength, in particular, to a polyvinyl alcohol-based polarizer. When the amount is 40% by weight or less, embrittlement of the adhesive can be suppressed, and photocurability can be improved.

Examples of the acrylamide derivatives may include N,N-dimethylacrylamide, N,N-diethylacrylamide, N,N-dimethylaminoethylacrylamide, N,N-dimethylaminopropylacrylamide, N-isopropylacrylamide, N,N-dimethylaminopropylacrylamide, and N-hydroxyethylacrylamide. In particular, N,N-diethylacrylamide, N-isopropylacrylamide, N,N-dimethylaminopropylacrylamide, N-hydroxyethylacrylamide and the like may be mentioned. As the acrylamide derivative, one type thereof may be solely used, and two or more types thereof may also be used in combination at any ratio.

The amount of the acrylamide derivative in the adhesive is preferably 0 to 30% by weight, and more preferably 1% by weight to 30% by weight.

In addition to the above-mentioned components, the acrylate adhesive preferably contains isobornyl (meth)acrylate in an amount of 30% by weight to 40% by weight. With isobornyl (meth)acrylate, heat resistance is imparted to the adhesive, and viscosity adjustment for improving coating performance is possible without deteriorating adhesion performance.

Furthermore, the acrylate adhesive preferably contains 2% by weight to 10% by weight of a photopolymerization initiator. Examples of the photopolymerization initiator may include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propan-1-one, and 2,4,6-trimethylbenzoyl diphenylphosphine oxide. As the photopolymerization initiator, one type thereof may be solely used, and two or more types thereof may also be used in combination at any ratio.

The epoxy-based adhesive contains an epoxy compound. From the viewpoint of weather resistance, refractive index, and cationic polymerizability, it is preferable that the epoxy compound contains as a main component an epoxy compound which does not contain an aromatic ring in the molecule. Examples of the epoxy compound having no aromatic ring in the molecule may include a glycidyl ether of a polyol having an alicyclic ring, an aliphatic epoxy compound, and an alicyclic epoxy compound.

The glycidyl ether of the polyol having an alicyclic ring may be those obtained by subjecting a nucleus-hydrogenated polyhydroxy compound to glycidyl etherification, wherein the nucleus-hydrogenated polyhydroxy compound is a compound obtained by selective hydrogenation of an aromatic ring of an aromatic polyol under pressure in the presence of a catalyst. Examples of the aromatic polyol may include bisphenol type compounds such as bisphenol A, bisphenol F, and bisphenol S; and polyfunctional type compounds such as a phenol novolac resin and a cresol novolac resin. An alicyclic polyol obtained by hydrogenating an aromatic ring of these aromatic polyols may be reacted with epichlorohydrin to obtain a glycidyl ether. Among such glycidyl ethers of the polyol having an alicyclic ring, a diglycidyl ether of hydrogenated bisphenol A may be mentioned as a preferable glycidyl ether.

The aliphatic epoxy compound may be a polyglycidyl ether of an aliphatic polyhydric alcohol or an alkylene oxide adduct thereof. Examples of the aliphatic epoxy compound may include a diglycidyl ether of 1,4-butanediol; a diglycidyl ether of 1,6-hexanediol; a triglycidyl ether of glycerin; a triglycidyl ether of trimethylolpropane; a diglycidyl ether of polyethylene glycol; a diglycidyl ether of propylene glycol; and a polyglycidyl ether of polyether polyol obtained by adding one or more alkylene oxides (ethylene oxide, propylene oxide, etc.) to an aliphatic polyhydric alcohol such as ethylene glycol, propylene glycol or glycerin.

In the epoxy-based adhesive, as the epoxy compound, one type thereof may be solely used, and two or more types thereof may also be used in combination at any ratio.

Further, the epoxy-based adhesive may contain an oxetane compound in addition to the above-described epoxy compound. By using an oxetane compound, viscosity of the epoxy-based adhesive can be lowered and curing speed can be increased.

The oxetane compound is a compound having at least one oxetane ring (4-membered ring ether) in the molecule. Examples of the oxetane compound may include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane, and phenol novolac oxetane. As these oxetane compounds, commercially available products can be easily obtained. Examples of the commercially available products may include product names of "ARON OXETANE OXT-101", "ARON OXETANE OXT-121", "ARON OXETANE OXT-211", "ARON OXETANE OXT-221", and "ARON OXETANE OXT-212", all of which are sold by Toagosei Co., Ltd. The amount of the oxetane compound is not particularly limited, but it is usually 50% by weight or less, and preferably 10% by weight to 40% by weight, based on the entire active energy ray-curable compound in the adhesive.

When the adhesive contains a cationically polymerizable compound such as an epoxy compound and an oxetane compound, a cationic photopolymerization initiator is usually added to the adhesive. When a cationic photopolymerization initiator is used, it is possible to form an adhesive layer at room temperature. Therefore, necessity of considering the heat resistance of the polarizer and the distortion due to expansion is reduced, and the polarizer and the long-length film can be bonded to each other with good adhesion. In addition, since the cationic photopolymerization initiator acts catalytically with light, even if the adhesive contains the cationic photopolymerization initiator, the adhesive is excellent in storage stability and workability.

The cationic photopolymerization initiator can generate a cationic species or a Lewis acid by irradiation with active energy rays such as visible rays, ultraviolet rays, X rays, electron beam and the like to initiate the polymerization reaction of the cationically polymerizable compound. The cationic photopolymerization initiator may be of any type. Specific examples thereof may include aromatic diazonium salts; onium salts such as an aromatic iodonium salt and an aromatic sulfonium salt; and iron-arene complexes.

Examples of the aromatic diazonium salt may include benzene diazonium hexafluoroantimonate, benzene diazonium hexafluorophosphate, and benzene diazonium hexafluoroborate.

Examples of the aromatic iodonium salt may include diphenyliodonium tetrakis(pentafluorophenyl)borate, diphenyliodonium hexafluorophosphate, diphenyliodonium hexafluoroantimonate, and di(4-nonylphenyl)iodonium hexafluorophosphate.

These cationic photopolymerization initiators can be easily obtained as commercially available products. Examples of the commercially available products may include KAYARAD PCI-220 and KAYARAD PCI-620 manufactured by Nippon Kayaku Co., Ltd.; UVI-6990 manufactured by Union Carbide Corporation; UVACURE 1590 manufactured by Daicel-Cytec Co., Ltd.; ADEKA OPTOMER SP-150 and ADEKA OPTOMER SP-170 manufactured by Adeka Corporation; CI-5102, CIT-1370, CIT-1682, CIP-18665, CIP-20485, and CIP-20645 manufactured by Nippon Soda Co., Ltd.; DPI-101, DPI-102, DPI-103, DPI-105, MPI-103, MPI-105, BBI-101, BBI-102, BBI-103, BBI-105, TPS-101, TPS-102, TPS-103, TPS-105, MDS-103, MDS-105, DTS-102, and DTS-103 manufactured by Midori Kagaku Co., Ltd.; and PI-2074 manufactured by Rohdia.

The viscosity of the above-described adhesive at 23° C. is preferably 20 mPa to 5000 mPa, more preferably 30 mPa to 3000 mPa, and particularly preferably 50 mPa to 1500 mPa.

In the case of bonding the polarizer and the long-length film using the adhesive, after the polarizer and the long-length film are bonded together via the adhesive, the adhesive may be cured, if necessary. As the method for curing the adhesive, an appropriate method may be adopted depending on the type of the adhesive. For example, when a photocurable type adhesive is used, the adhesive may be cured by irradiation with active energy rays such as ultraviolet rays. When ultraviolet rays are used as the active energy ray, the irradiation intensity of ultraviolet rays is preferably 200 mJ/cm$^2$ or more, and more preferably 300 mJ/cm$^2$ or more, and is preferably 7000 mJ/cm$^2$ or less, and more preferably 6000 mJ/cm$^2$ or less. When the irradiation intensity of ultraviolet rays is equal to or more than the lower limit value of the aforementioned range, curing of the adhesive can be sufficiently advanced, so that peeling of the polarizer from the long-length film can be suppressed. When the irradiation intensity of ultraviolet rays is equal to or lower than the upper limit value of the aforementioned range, melting of the long-length film due to heat of irradiation with ultraviolet rays can be suppressed.

In the case of using the adhesive, an adhesive layer is provided between the polarizer and the long-length film. The average thickness of this adhesive layer is preferably 0.05 μm or more, and more preferably 0.1 μm or more, and is preferably 5 μm or less, and more preferably 1 μm or less.

EXAMPLE

Hereinafter, the present invention will be specifically described by illustrating Examples. However, the present invention is not limited to the Examples described below. The present invention may be optionally modified for implementation without departing from the scope of claims of the present invention and the scope of their equivalents. In the following description, "%", "ppm", and "part" representing quantity are on the basis of weight, unless otherwise specified. The operation described below was performed under the conditions of normal temperature and normal pressure in the atmospheric air, unless otherwise specified.

[Evaluation Method]

[Method for Measuring Height of Concavo-Convex Portion]

The heights of respective corner portions and respective straight portions of the knurl portion of the long-length film were measured using a three-dimensional surface profiler ("NewView 5000" manufactured by Zygo Corporation). From the measured height values, the average heights of the corner portions and the straight portions were calculated.

[Method for Measuring Curvature Radius of Corner Portion]

The curvature radius of the corner portion of the knurl portion of the long-length film were measured using a three-dimensional surface profiler ("NewView 5000" manufactured by Zygo Corporation).

[Method for Evaluating Meander Amount of Film]

The conveyance position of the long-length film including knurl portions formed therein was measured while the long-length film was conveyed in the lengthwise direction of the long-length film. The displacement amount of the conveyance position in the widthwise direction of the film caused from start to end of conveyance relative to the conveyance position at the time point of starting the conveyance as a reference position was determined as the meander amount of the long-length film. When the obtained meander amount is 5 mm or less, the result was evaluated as "good", and when more than 5 mm, evaluated as "poor".

[Method For Evaluating Winding Displacement Amount Of Film]

The long-length film including the knurl portions formed therein was conveyed in the lengthwise direction of the long-length film, and wound around a winding core to obtain a film roll. A difference in the widthwise direction of the film (that is, the axial direction of the roll) between the position of the long-length film at the innermost part in the radial direction of the film roll (winding start position) and the position of the long-length film at the outermost part in the radial direction of the film roll (winding end position) was determined as a winding displacement amount. When the obtained winding displacement amount is 5 mm or less, the result was evaluated as "good", and when more than 5 mm, evaluated as "poor".

Example 1

[Production of Substrate Layer]

Pellets of a cyclic olefin resin ("ZEONOR 1430" manufactured by ZEON Corporation, glass transition temperature: 135° C.) were dried using a hot air dryer with air circulation at 70° C. for 2 hours. The dried pellets were supplied to a T die-type film melt extrusion molding machine having a resin melt kneader equipped with a 65-mmφ screw, and extrusion-molded under the molding conditions of a melt resin temperature of 270° C. and a T die width of 1700 mm. Thus, a long-length substrate layer (thickness: 50 μm, width: 1500 mm, length: 2000 m) was produced.

<Production of Pretreatment Film (Formation of Adhesion Facilitating Layer)>

Into a 2000-ml four-necked flask equipped with a thermometer, a stirrer, a nitrogen introduction pipe, and a cooling pipe, 840 g of a polyester polyol ("MAXIMOL FSK-2000" manufactured by Kawasaki Kasei Chemicals Ltd., hydroxyl value 56 mgKOH/g), 119 g of tolylene diisocyanate as a polyvalent isocyanate component, and 200 g of methyl ethyl ketone as a solvent were charged. The mixture was reacted at 75° C. for 1 hour with nitrogen being introduced.

After the reaction ended, the resultant was cooled to 60° C., and thereto 35.6 g of dimethylolpropionic acid was added for introducing an acid structure. The mixture was reacted at 75° C. to obtain a solution of a polyurethane containing an acid structure. The content of the isocyanate group (—NCO group) of polyurethane contained in this solution was 0.5%.

Subsequently, this polyurethane solution was cooled to 40° C., and thereto 1500 g of water and 10.6 g of sodium hydroxide as a neutralizer were added. The mixture was rapidly stirred by a homomixer for emulsification. This emulsified liquid was placed under heat and reduced pressure to distil away methyl ethyl ketone. Thereafter, thereto 99.5 g of silica beads ("AEROSIL 130" manufactured by Nippon Aerosil Co., Ltd., average particle diameter: 16 nm) were added. The mixture was stirred, and then water was added thereto such that the solid content concentration became 10% for neutralization treatment. Accordingly, a neutralized aqueous dispersion of the water-based urethane resin was obtained.

Onto one surface of the aforementioned substrate layer, the aforementioned aqueous dispersion of the water-based urethane resin was applied by a reverse roll method such that the thickness after drying became 100 nm, and dried at 90° C. Accordingly, an adhesion facilitating layer was formed on one surface of the substrate layer. Thus, a pretreatment film having a multilayer structure including the substrate layer and the adhesion facilitating layer was obtained.

<Formation of Knurl Portion>

The aforementioned pretreatment film was conveyed in the lengthwise direction at a speed of 30 m/min. Then, the surface on the adhesion facilitating layer side at both left and right end sections in the widthwise direction of the conveyed pretreatment film was irradiated with laser light. As the irradiation device of laser light, a $CO_2$ laser light irradiation device ("LP-430U" manufactured by Panasonic SUNX Co., Ltd., laser wavelength: 10.6 μm) was used. The irradiation output of laser light was 90%.

Figure 7:
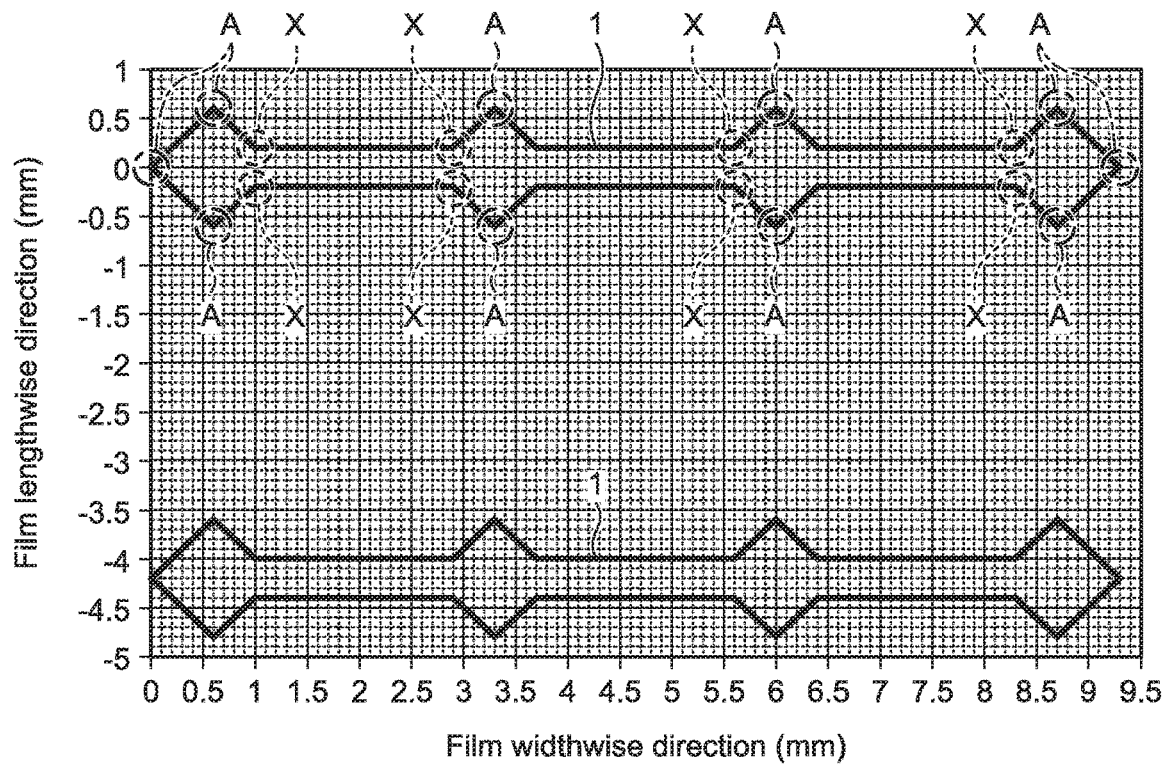
FIG. 7 is a plan view schematically illustrating a planar shape of a knurl portion formed in Example 1 of the present invention.

FIG. 7 is a plan view schematically illustrating a planar shape of a knurl portion 1 formed in Example 1 of the present invention. In FIG. 7, for showing the size of the knurl portion 1, the coordinate of the lengthwise direction and the widthwise direction of the long-length film is indicated. The unit for values in this coordinate is millimeters.

The aforementioned irradiation with laser light was performed such that the planar shape of the knurl portion 1 illustrated in FIG. 7 was drawn, while a laser light irradiation point was moved by a moving speed of 2000 mm/s. In the planar shape of the knurl portion 1 illustrated in FIG. 7, the corner portion A indicated by surrounding dot-and-dash line had an angle of 90°. In the planar shape of the knurl portion 1, the angle of the non-straight portion X other than the corner portion A (a non-straight portion indicated by surrounding broken line in FIG. 7) was 135°. By the aforementioned irradiation with laser light, a plurality of knurl portions 1 having the planar shape illustrated in FIG. 7 which are aligned at a pitch of 4.2 mm in the lengthwise direction of the film and shaped by linear concavo-convex portions was formed on the surface of the pretreatment film on the adhesion facilitating layer side. Accordingly, a long-length film including the knurl portions 1 on its surface was obtained. In each of the formed knurl portions 1, the curvature radius of the corner portion A was measured, and the result was 0.2 mm. The average heights of the concavo-convex portion at the corner portion and the straight portion were measured by the aforementioned method.

The obtained long-length film was further conveyed in the lengthwise direction, and wound around a winding core with a diameter of 6 inches for 1000 m in the lengthwise direction at a winding tension of 120 N. Thus, a film roll was obtained. In winding, the meander amount and the winding displacement amount of the long-length film were measured, and evaluated by the aforementioned method.

Example 2

Figure 8:
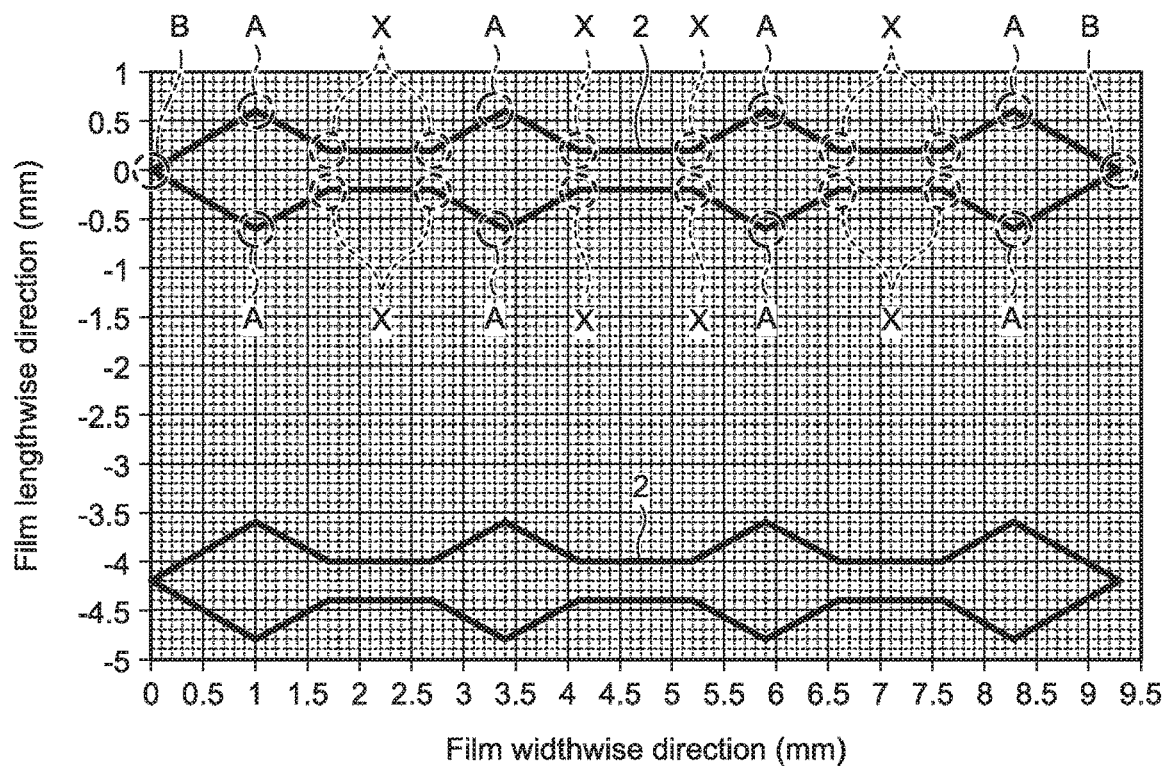
FIG. 8 is a plan view schematically illustrating a planar shape of a knurl portion formed in Example 2 of the present invention.

FIG. 8 is a plan view schematically illustrating a planar shape of a knurl portion 2 formed in Example 2 of the present invention. In FIG. 8, for showing the size of the knurl portion 2, the coordinate of the lengthwise direction and the widthwise direction of the long-length film is indicated. The unit for values in this coordinate is millimeters.

In Example 2, a long-length film was produced and evaluated in the same manner as that in Example 1, except that the planar shape of the formed knurl portion 2 was changed to that illustrated in FIG. 8. In the planar shape of the knurl portion 2 illustrated in FIG. 8, the corner portion A indicated by surrounding dot-and-dash line had an angle of 120°. In the planar shape of the knurl portion 2, the corner portion B indicated by chain doubledot-and-dash line had an angle of 60°. Furthermore, in the planar shape of the knurl portion 2, the angle of the non-straight portion X other than the corner portion A and the corner portion B (a non-straight portion indicated by surrounding broken line in FIG. 8) was 150°. In the formed knurl portion 2, the curvature radii of the corner portion A and the corner portion B were measured, and the results were 0.1 mm and 0.2 mm.

Example 3

Figure 9:
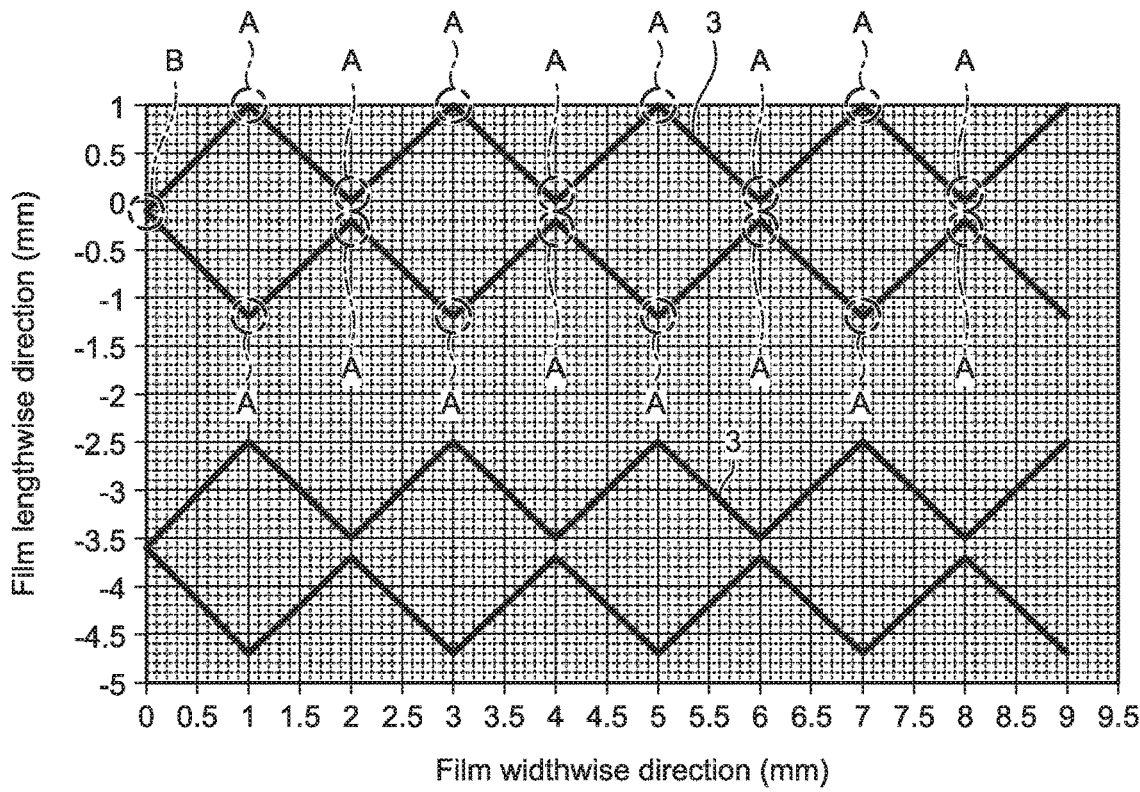
FIG. 9 is a plan view schematically illustrating a planar shape of a knurl portion formed in Example 3 of the present invention.

FIG. 9 is a plan view schematically illustrating a planar shape of a knurl portion 3 formed in Example 3 of the present invention. In FIG. 9, for showing the size of the knurl portion 3, the coordinate of the lengthwise direction and the widthwise direction of the long-length film is indicated. The unit for values in this coordinate is millimeters.

In Example 3, a long-length film was produced and evaluated in the same manner as that in Example 1, except that the planar shape of the formed knurl portion 3 was changed to that illustrated in FIG. 9. In the planar shape of the knurl portion 3 illustrated in FIG. 9, the corner portion A indicated by surrounding dot-and-dash line had an angle of 90°. In the planar shape of the knurl portion 3, the corner portion B indicated by chain doubledot-and-dash line had an angle of 96°. In the formed knurl portion 3, the curvature radii of the corner portion A and the corner portion B were measured, and the results were 0.2 mm and 0.2 mm.

Comparative Example 1

Figure 10:
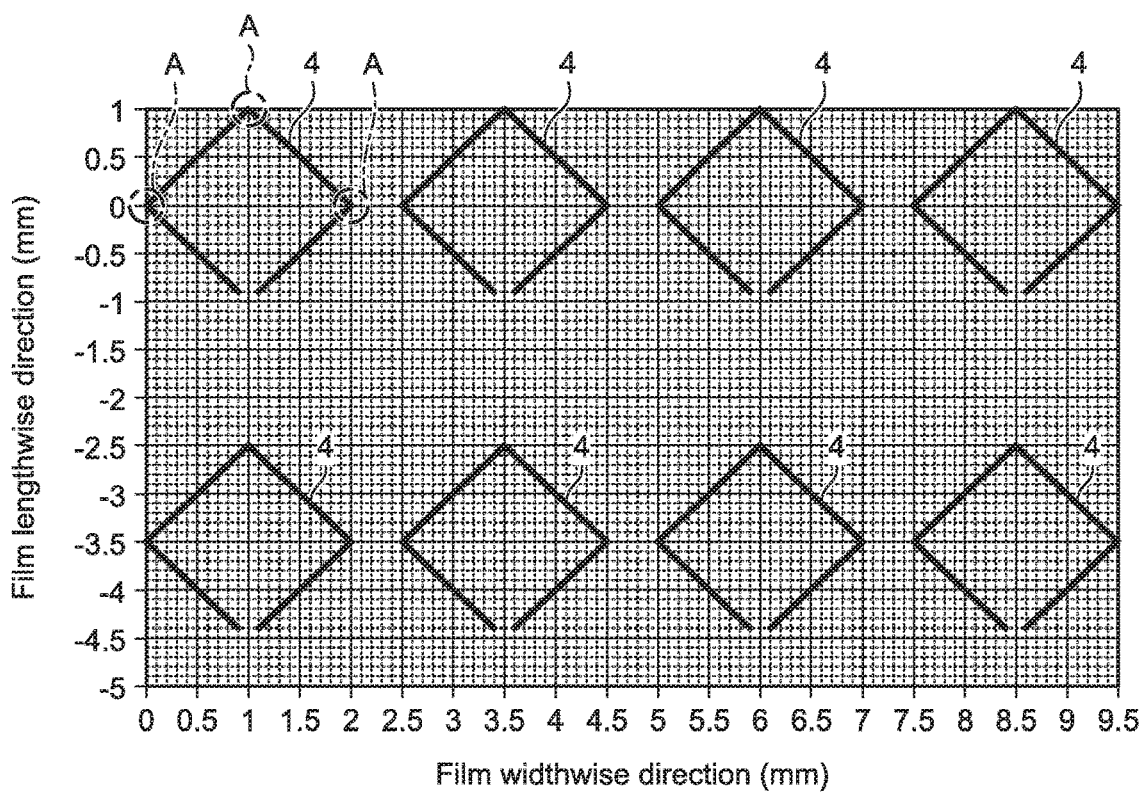
FIG. 10 is a plan view schematically illustrating a planar shape of a knurl portion formed in Comparative Example 1.

FIG. 10 is a plan view schematically illustrating a planar shape of a knurl portion 4 formed in Comparative Example 1. In FIG. 10, for showing the size of the knurl portion 4, the coordinate of the lengthwise direction and the widthwise direction of the long-length film is indicated. The unit for values in this coordinate is millimeters.

In Comparative Example 1, a long-length film was produced and evaluated in the same manner as that in Example 1, except that the planar shape of the formed knurl portion 4 was changed to that illustrated in FIG. 10. In Comparative Example 1, however, in order to prepare the conditions for comparison with Examples 1 to 3, the knurl portions 4 were formed such that four knurl portions 4 were arranged side by side in each row in the widthwise direction of the long-length film, as illustrated in FIG. 10. In the planar shape of the knurl portion 4, the corner portion A indicated by dot-and-dash line had an angle of 90°. In the formed knurl portion 4, the curvature radius of the corner portion A was measured, and the result was 0.2 mm.

Comparative Example 2

A long-length film was produced and evaluated in the same manner as that of Example 1, except that the moving speed of the laser light irradiation point was changed to 3000 mm/s when the pretreatment film was irradiated with laser light. In the formed knurl portion, the curvature radius of the corner portion A was measured, and the result was 0.4 mm.

[Results]

The results of the aforementioned Examples and Comparative Examples are shown in the following Table 1. In Table 1, abbreviations mean as follows.

Scan speed: moving speed of laser light irradiation point

TABLE 1

[Results of Examples and Comparative Examples]

| | Ex. 1 | Ex. 2 | Ex. 3 | Comp. Ex. 1 | Comp. Ex. 2 |
|---|---|---|---|---|---|
| Planar shape | FIG. 7 | FIG. 8 | FIG. 9 | FIG. 10 | FIG. 7 |
| Scan speed (mm/s) | 2000 | 2000 | 2000 | 2000 | 3000 |
| Total number of corner portions | 10 | 10 | 18 | 3 | 10 |
| Total number of straight portions | 22 | 22 | 18 | 4 | 22 |
| Corner portion A angle (°) | 90 | 120 | 90 | 90 | 90 |
| Corner portion A curvature radius (mm) | 0.2 | 0.1 | 0.2 | 0.2 | 0.4 |
| Corner portion B angle (°) | — | 60 | 96 | — | — |
| Corner portion B curvature radius (mm) | — | 0.2 | 0.2 | — | — |
| Concavo-convex portions average height at corner portion (μm) | 5 | 4.5 | 5 | 5 | 3.5 |
| Concavo-convex portions average height at straight portion (μm) | 3 | 3 | 3 | 3 | 3 |
| Meander amount (mm) | 1 | 2 | 4 | 5 | 8 |
| Meander evaluation | Good | Good | Good | Good | Poor |

TABLE 1-continued

[Results of Examples and Comparative Examples]

|  | Ex. 1 | Ex. 2 | Ex. 3 | Comp. Ex. 1 | Comp. Ex. 2 |
|---|---|---|---|---|---|
| Winding displacement amount (mm) | 1 | 3 | 3 | 8 | 10 |
| Winding displacement evaluation | Good | Good | Good | Poor | Poor |

[Discussion]

As can be seen from Table 1, in Examples 1 to 3, favorable results are obtained in both the meander evaluation and the winding displacement evaluation. Therefore, it was confirmed that according to the present invention, a long-length film being excellent in conveyance properties and winding properties can be achieved.

REFERENCE SIGN LIST 1-4 knurl portions
100 long-length film
100U surface of long-length film
110 knurl portions
111 corner portion
112 straight portion
113 non-straight portion
120 concavo-convex portion
121 concave portion
122 convex portion

The invention claimed is:

1. A long-length film comprising a plurality of knurl portions shaped by continuous linear concavo-convex portions on at least one surface thereof, wherein the plurality of knurl portions are aligned in a lengthwise direction of the long-length film, a planar shape of the knurl portion seen from a thickness direction of the long-length film includes:

10 or more corners having a curvature radius of 0.3 mm or less and an angle of 100° or less or a curvature radius of 0.2 mm or less and an angle of 120° or less, per one planar shape of the knurl portion; and 18 or more straight portions having a straight shape, per one planar shape of the knurl portion.

2. The long-length film according to claim 1, wherein a ratio $L_{TD}/L_{MD}$ between a length $L_{TD}$ of one knurl portion in a widthwise direction of the long-length film and a length $L_{MD}$ of one knurl portion in a lengthwise direction of the long-length film satisfies $L_{TD}/L_{MD} \geq 2$.

3. The long-length film according to claim 1, comprising a substrate layer formed of any of a cyclic olefin resin and a (meth)acrylic resin.

4. The long-length film according to claim 3, comprising the substrate layer and a functional layer disposed on a side of the knurl portions of the substrate layer, wherein
the functional layer has a thickness which is 10% or less of a thickness of the substrate layer.

5. The long-length film according to claim 2, comprising a substrate layer formed of any of a cyclic olefin resin and a (meth)acrylic resin.

6. The long-length film according to claim 5, comprising the substrate layer and a functional layer disposed on a side of the knurl portions of the substrate layer, wherein
the functional layer has a thickness which is 10% or less of a thickness of the substrate layer.

* * * * *